United States Patent [19]

Tsuji

[11] Patent Number: 4,742,400
[45] Date of Patent: May 3, 1988

[54] DIGITAL IMAGE PROCESSING DEVICE FOR INTERMEDIATE TONE

[75] Inventor: Katsuhisa Tsuji, Tokyo, Japan

[73] Assignee: Ricoh Corporation, Tokyo, Japan

[21] Appl. No.: 12,078

[22] Filed: Feb. 5, 1987

[30] Foreign Application Priority Data

Feb. 12, 1986 [JP] Japan ................................. 61-28643
Feb. 12, 1986 [JP] Japan ................................. 61-28646
Feb. 12, 1986 [JP] Japan ................................. 61-28644
Feb. 12, 1986 [JP] Japan ................................. 61-28645

[51] Int. Cl.⁴ ............................................... H04N 1/40
[52] U.S. Cl. .................................... 358/284; 358/283
[58] Field of Search ................ 358/283, 284, 282, 280

[56] References Cited

U.S. PATENT DOCUMENTS

| 4,549,212 | 10/1985 | Bayer | 358/284 |
| 4,553,165 | 11/1985 | Bayer | 358/284 |
| 4,623,936 | 11/1986 | Urban | 358/284 |
| 4,626,902 | 12/1986 | Yamada | 358/284 |
| 4,654,721 | 3/1987 | Goertzel | 358/284 |

Primary Examiner—Howard W. Britton
Attorney, Agent, or Firm—Mason, Fenwick & Lawrence

[57] ABSTRACT

A digital image processing device for intermediate tone having threshold value tables provided with threshold values different from each other set for each of picture elements in a unit region containing a plurality of picture elements for gradation processing, in which inputted multi-value data are converted into binary data referring to said table and intermediate tone is expressed by adjusting the number of picture elements to be dotted and picture elements not to be dotted within the unit region of the gradation processing.

32 Claims, 30 Drawing Sheets

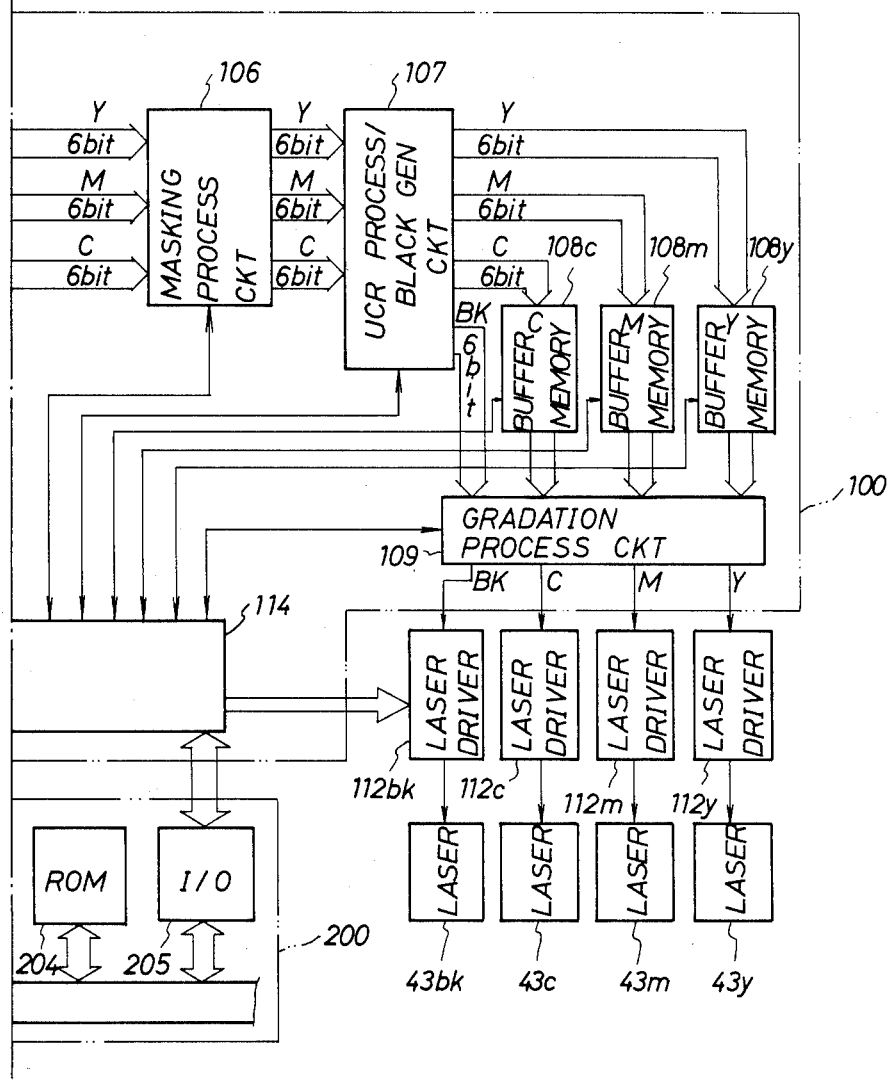

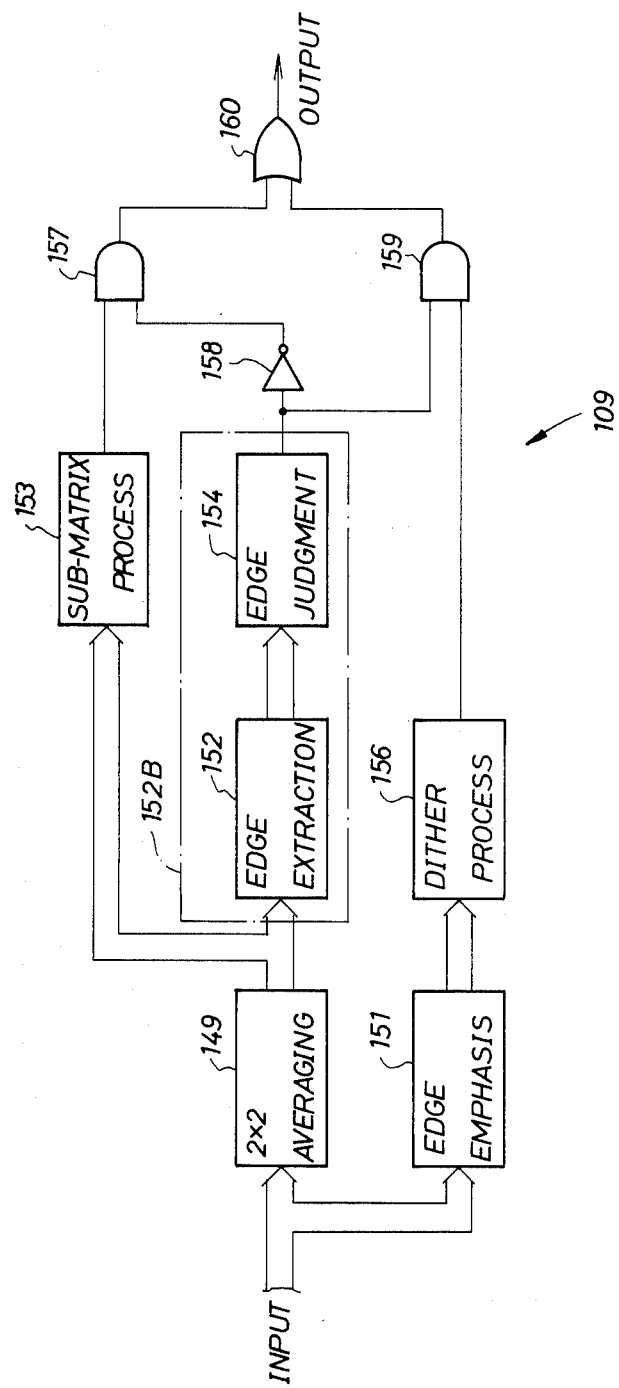

Figure 9:
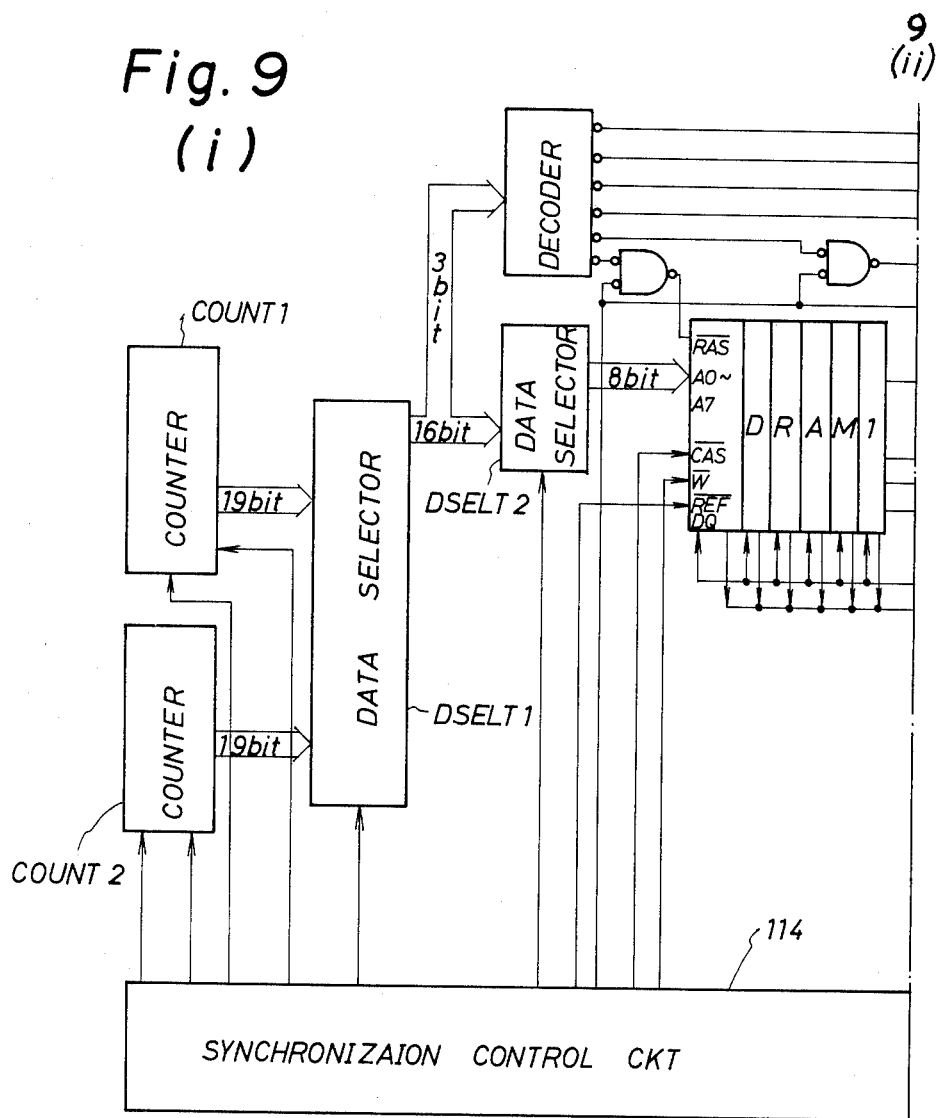

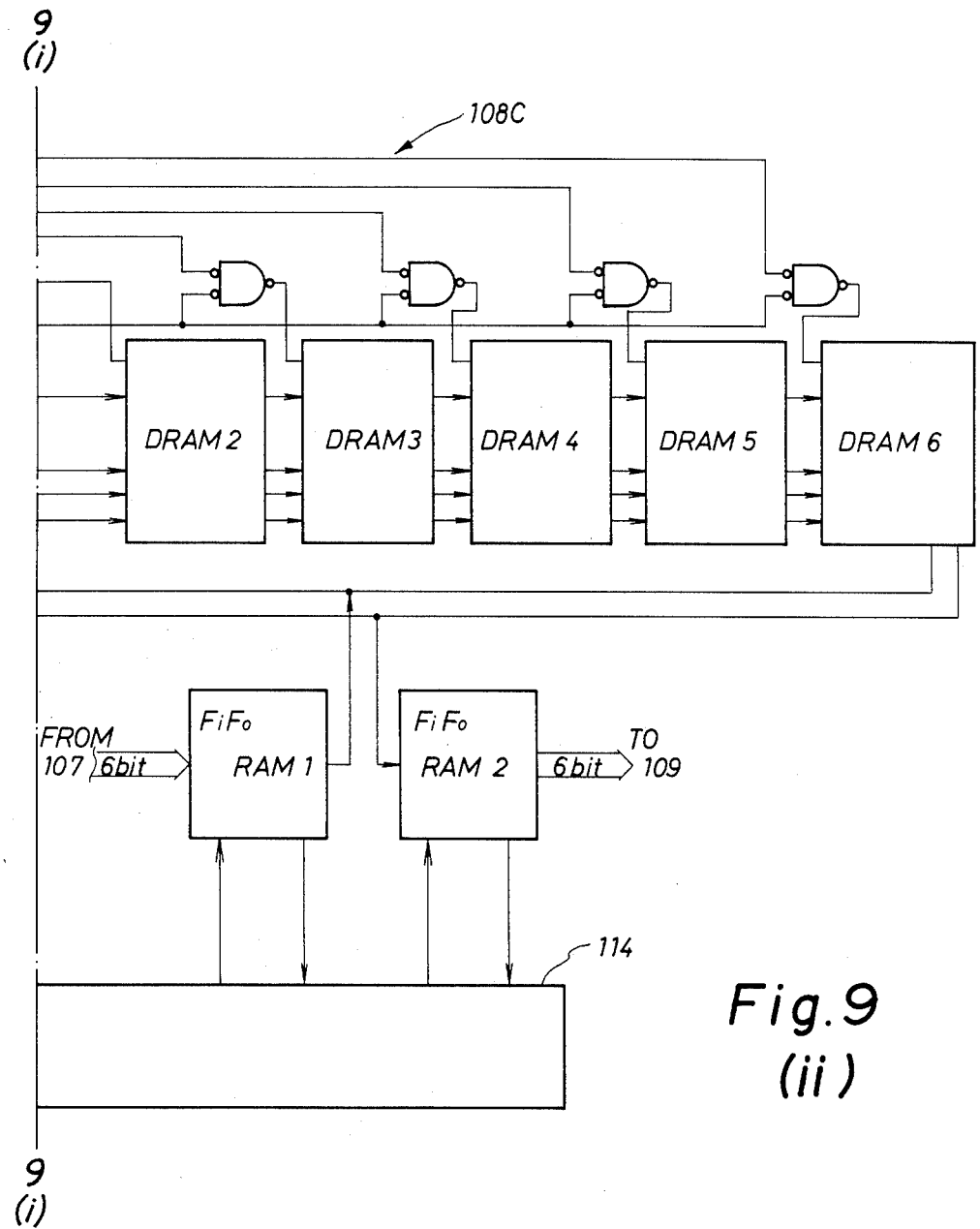
Fig. 9 (ii)

Fig.10a
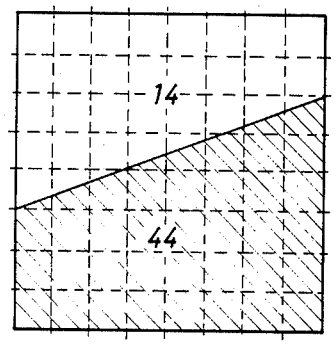
Fig.10b
| 15 | 16 | 15 | 14 | 14 | 14 | 15 | 15 |
|----|----|----|----|----|----|----|----|
| 15 | 14 | 14 | 14 | 15 | 15 | 16 | 15 |
| 14 | 15 | 14 | 15 | 15 | 20 | 30 | 40 |
| 15 | 15 | 17 | 25 | 40 | 42 | 45 | 44 |
| 20 | 35 | 42 | 44 | 44 | 44 | 44 | 44 |
| 44 | 44 | 45 | 44 | 44 | 44 | 44 | 44 |
| 44 | 44 | 44 | 44 | 45 | 44 | 44 | 44 |
| 44 | 44 | 44 | 44 | 44 | 44 | 44 | 44 |
Fig.10c
| 0  | 32 | 8  | 48 | 2  | 34 | 10 | 42 |
|----|----|----|----|----|----|----|----|
| 48 | 16 | 56 | 24 | 50 | 18 | 58 | 26 |
| 12 | 44 | 4  | 36 | 14 | 46 | 6  | 38 |
| 60 | 28 | 52 | 20 | 62 | 30 | 54 | 22 |
| 3  | 35 | 11 | 43 | 1  | 33 | 9  | 41 |
| 51 | 19 | 59 | 27 | 49 | 17 | 57 | 25 |
| 15 | 47 | 7  | 39 | 13 | 45 | 5  | 37 |
| 63 | 31 | 55 | 23 | 61 | 29 | 53 | 21 |
Fig.10d
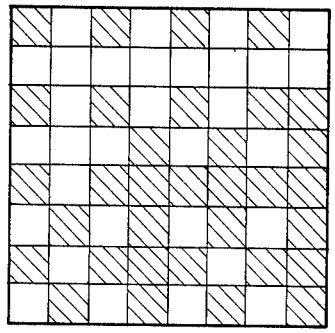
Fig.10e
| 58 | 53 | 39 | 28 | 27 | 42 | 54 | 59 |
|----|----|----|----|----|----|----|----|
| 48 | 40 | 21 | 14 | 13 | 20 | 41 | 49 |
| 34 | 22 | 10 | 4  | 3  | 9  | 19 | 35 |
| 29 | 15 | 5  | 1  | 2  | 8  | 18 | 32 |
| 38 | 23 | 11 | 6  | 7  | 12 | 26 | 37 |
| 52 | 45 | 24 | 16 | 17 | 25 | 44 | 51 |
| 62 | 56 | 46 | 30 | 31 | 43 | 55 | 61 |
| 63 | 57 | 47 | 33 | 36 | 50 | 60 | 63 |
Fig.10f
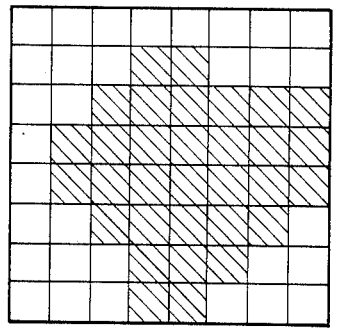

Fig.10g
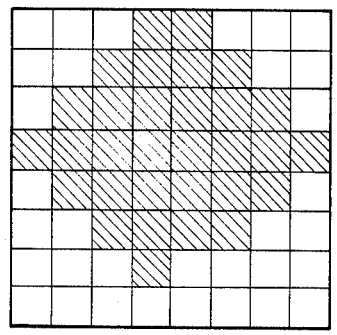
Fig.10h
| 15 | 14 | 14 | 15 |
|----|----|----|----|
| 15 | 18 | 29 | 40 |
| 36 | 44 | 44 | 44 |
| 44 | 44 | 44 | 44 |
Fig.10i
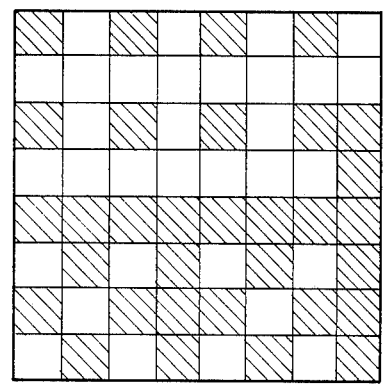
Fig.10j
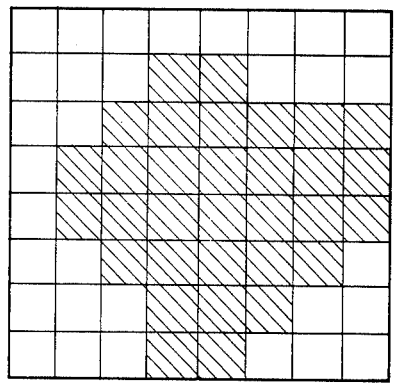
Fig.10k
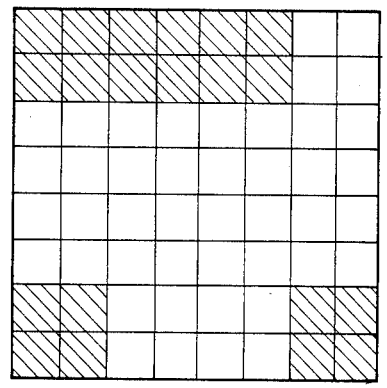

Fig.11a

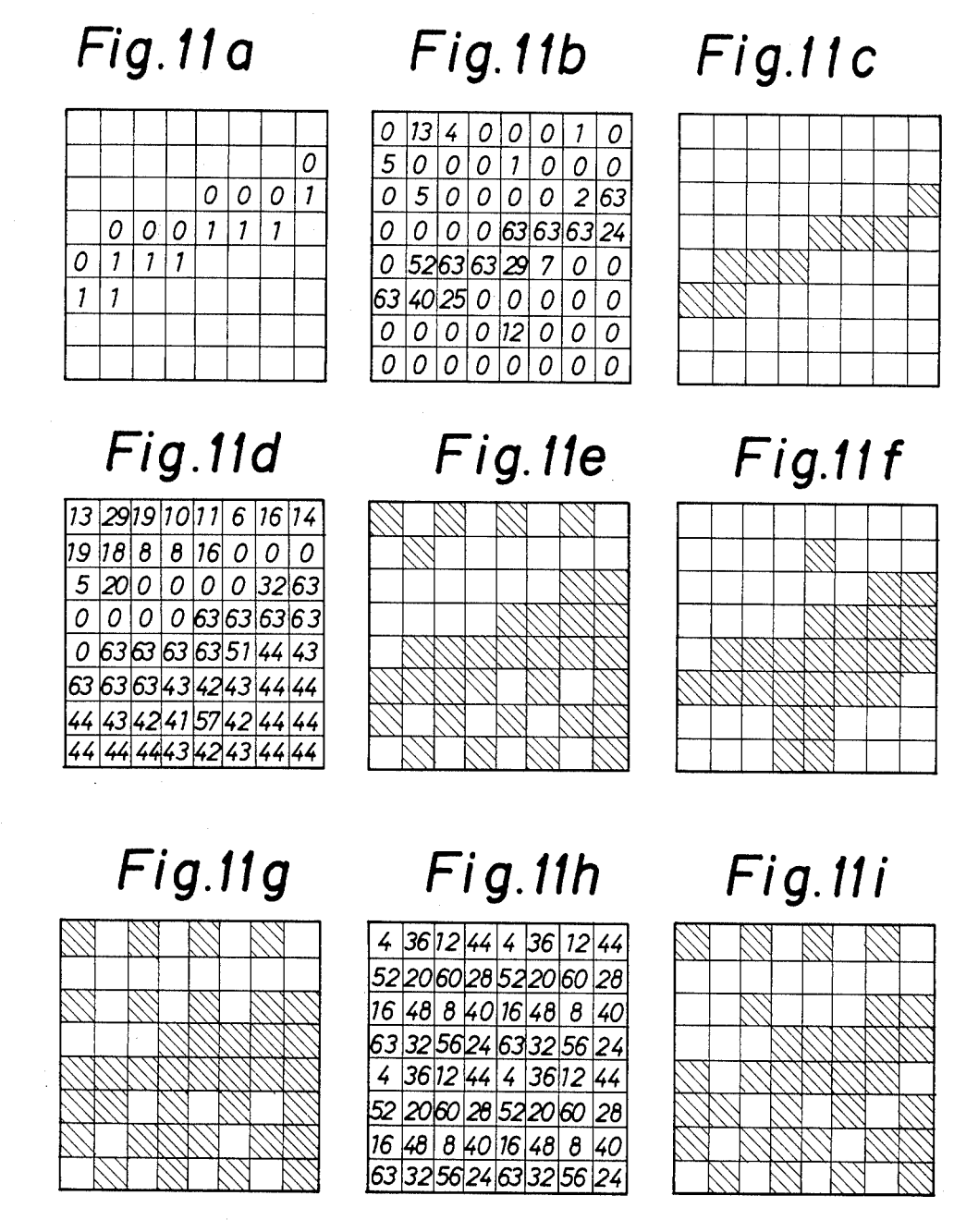

|   |   |   |   |   |   |   |   |
|---|---|---|---|---|---|---|---|
|   |   |   |   |   |   |   |   |
|   |   |   |   |   |   |   | 0 |
|   |   |   |   | 0 | 0 | 0 | 1 |
|   | 0 | 0 | 0 | 1 | 1 | 1 |   |
| 0 | 1 | 1 | 1 |   |   |   |   |
| 1 | 1 |   |   |   |   |   |   |
|   |   |   |   |   |   |   |   |
|   |   |   |   |   |   |   |   |

Fig.11b

| 0 | 13 | 4 | 0 | 0 | 0 | 1 | 0 |
|---|----|---|---|---|---|---|---|
| 5 | 0 | 0 | 0 | 1 | 0 | 0 | 0 |
| 0 | 5 | 0 | 0 | 0 | 0 | 2 | 63 |
| 0 | 0 | 0 | 0 | 63 | 63 | 63 | 24 |
| 0 | 52 | 63 | 63 | 29 | 7 | 0 | 0 |
| 63 | 40 | 25 | 0 | 0 | 0 | 0 | 0 |
| 0 | 0 | 0 | 0 | 12 | 0 | 0 | 0 |
| 0 | 0 | 0 | 0 | 0 | 0 | 0 | 0 |

Fig.11c

Fig.11d

| 13 | 29 | 19 | 10 | 11 | 6 | 16 | 14 |
|----|----|----|----|----|---|----|----|
| 19 | 18 | 8 | 8 | 16 | 0 | 0 | 0 |
| 5 | 20 | 0 | 0 | 0 | 0 | 32 | 63 |
| 0 | 0 | 0 | 0 | 63 | 63 | 63 | 63 |
| 0 | 63 | 63 | 63 | 63 | 51 | 44 | 43 |
| 63 | 63 | 63 | 43 | 42 | 43 | 44 | 44 |
| 44 | 43 | 42 | 41 | 57 | 42 | 44 | 44 |
| 44 | 44 | 44 | 43 | 42 | 43 | 44 | 44 |

| 4 | 36 | 12 | 44 | 4 | 36 | 12 | 44 |
|---|----|----|----|---|----|----|----|
| 52 | 20 | 60 | 28 | 52 | 20 | 60 | 28 |
| 16 | 48 | 8 | 40 | 16 | 48 | 8 | 40 |
| 63 | 32 | 56 | 24 | 63 | 32 | 56 | 24 |
| 4 | 36 | 12 | 44 | 4 | 36 | 12 | 44 |
| 52 | 20 | 60 | 28 | 52 | 20 | 60 | 28 |
| 16 | 48 | 8 | 40 | 16 | 48 | 8 | 40 |
| 63 | 32 | 56 | 24 | 63 | 32 | 56 | 24 |

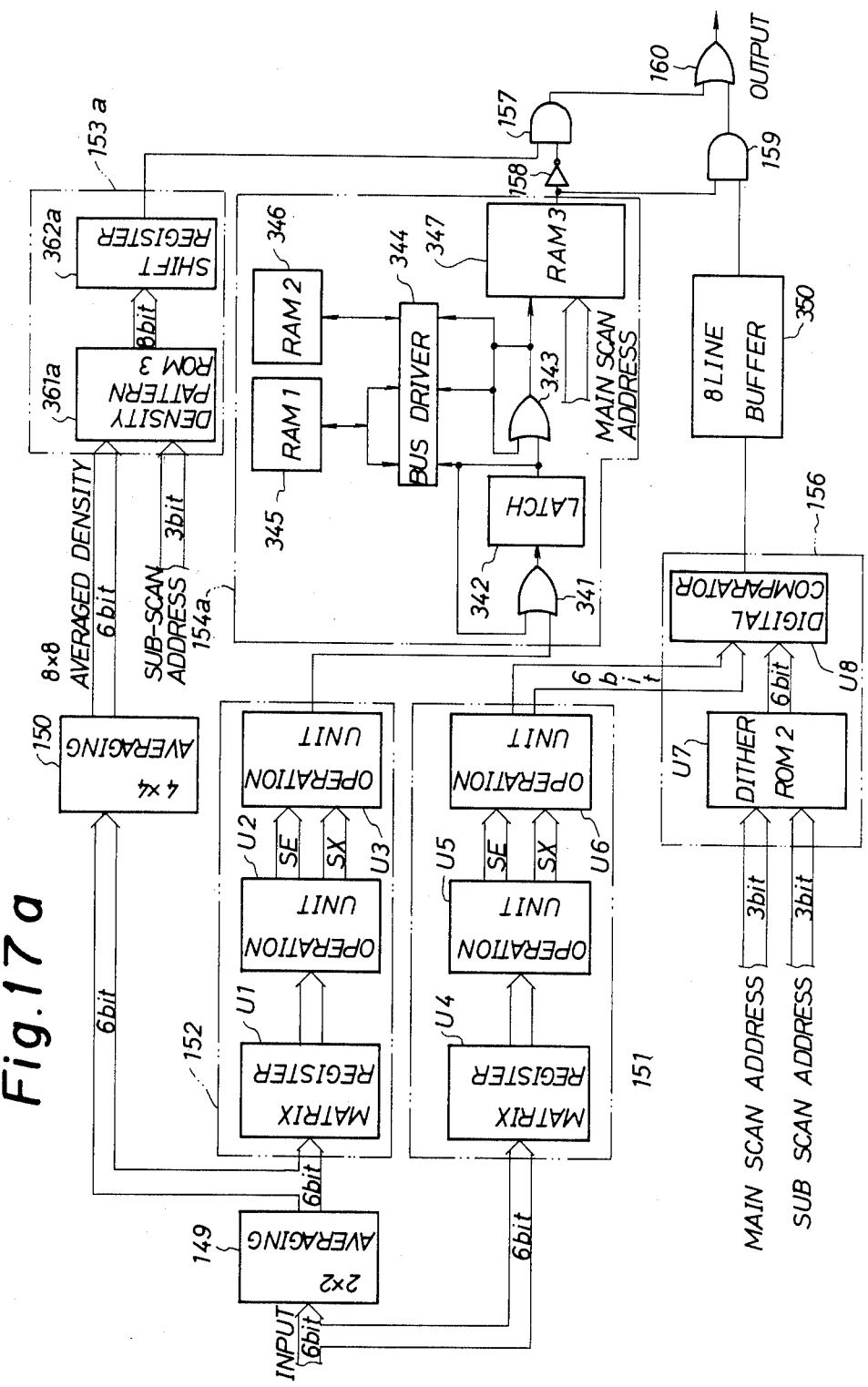

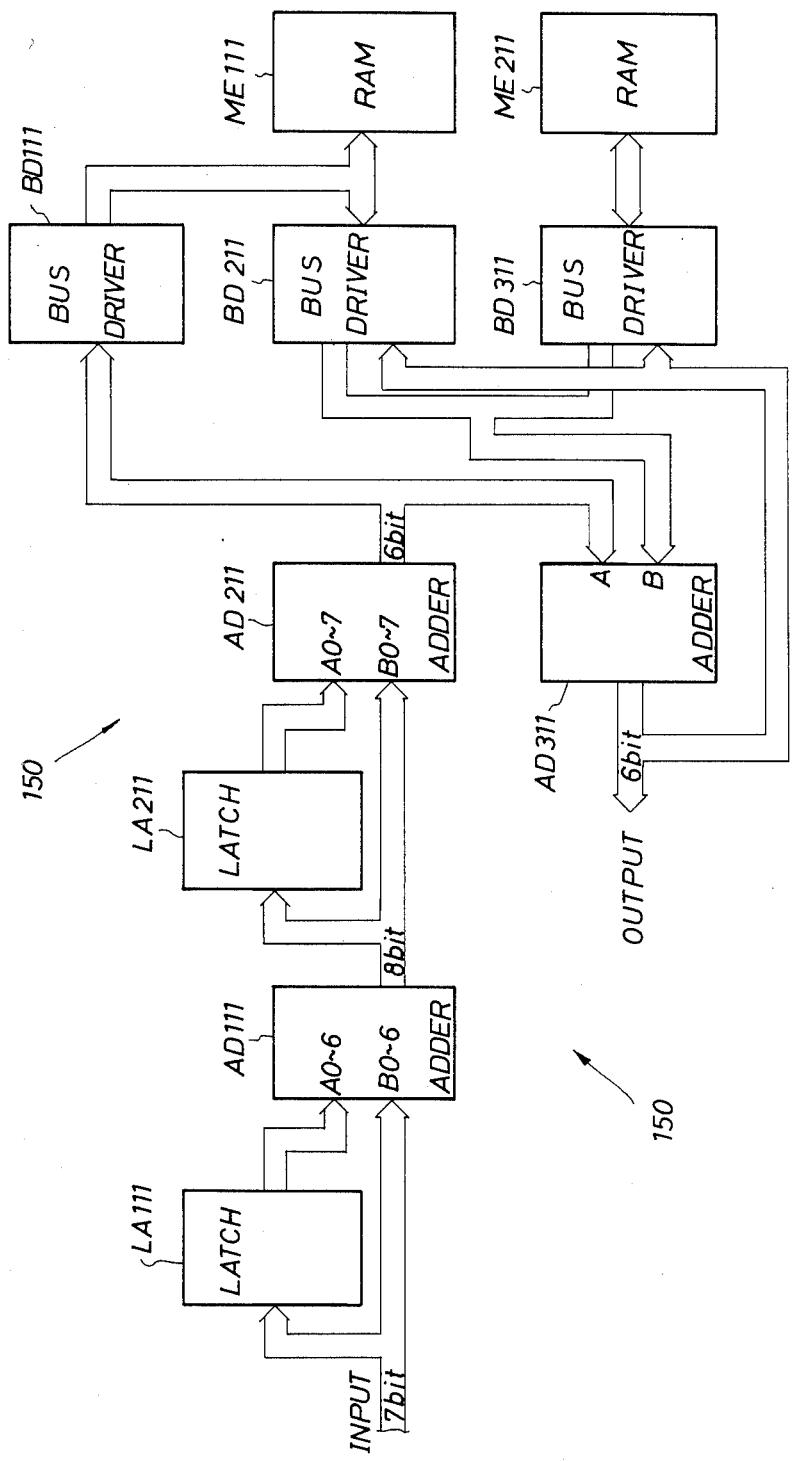

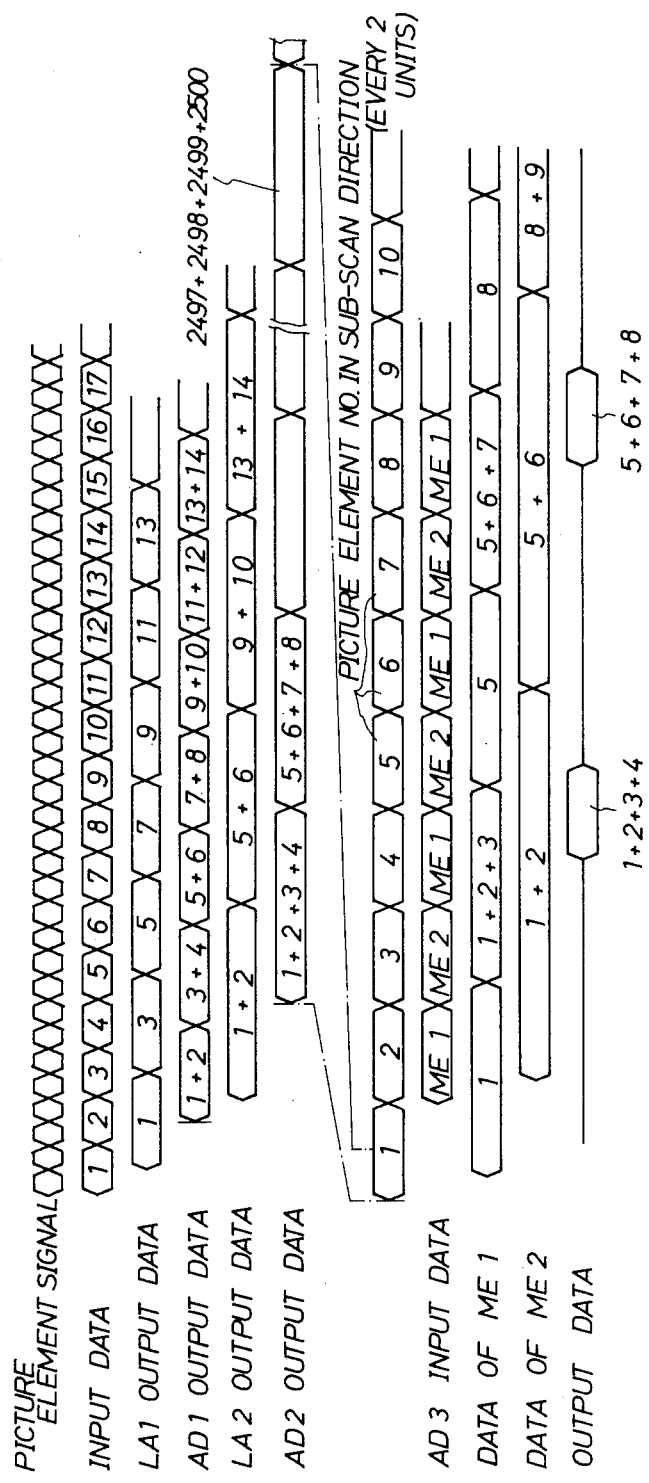

DIGITAL IMAGE PROCESSING DEVICE FOR INTERMEDIATE TONE

This invention concerns a digital image processing device for intermediate tone and, more particularly, relates to said device capable of improving the resolution of information such as letters and linear pictures in case of performing intermediate tone processing by the area gradation method.

In case of recording an image by a dot matrix system, the density level of each of dots can be adjusted to about only four steps at most in usual recording apparatus. However, in digital color copying machines, for example, 64 steps of gradation with each of fundamental recording colors of yellow (Y), magenta (M), cyan (C), black (BK) and the like has been required.

In order to obtain such multi-gradation steps, it has been conducted to set up a relatively large dot region composed of a plurality number of dots (for example, $8 \times 8$) as the unit region of the gradation processing and adjust the number of dots to be recorded and the number of dots not to be recorded in each of the dot regions to express density level of the each region of the gradation processing. The recording method of this type is referred to as the area gradation method.

By the way, if a $8 \times 8$ dot region is used, for example, as the unit for the gradation processing, the resolution for recording is reduced to $\frac{1}{8}$ compared with a case using 1 dot as the unit for the gradation processing. In photographs or like other images, high evaluation can be obtained concerning the recording quality even if the resolution is lower provided that the intermediate tone, that is, the density of each of the picture elements is expressed exactly. However, in the case of linear pictures or letters, reduction in the resolution directly leads to the degradation in the recording quality.

Generally, in those images containing linear pictures or letters, expression of gradation is often unnecessary. Then, it has been proposed to switch the image information processing into binarization processing or gradation processing according to the contents of the image to be processed. However, in the case of processing multicolor images, for example, it is necessary to treat each of the picture element information of letters and linear pictures as the intermediate tone data for reproducing the respective colors. Further, in case of white/black recording, it is sometime desirable to express letters or linear pictures at an intermediate tone such as gray color.

The first object of this invention is to improve the reproduced image quality in case of conducting the gradation expression by using the area gradation method.

The second object of this invention is to conduct adequate gradation processing for original images subjected to mesh-point processing.

In order to attain the foregoing objects, in this invention, a plurality of gradation processing means different from each other in processing contents are provided, input data are judged as to whether they contain edge information or not and the content of the gradation processing is automatically switched according to the result of the judgement.

Specifically, the first gradation processing means outputs data obtained by binarizing the input data of every picture element unit by the dither method after applying edge emphasis processing, or outputs data synthesized from the result of binarizing the input data of every picture element units by the dither method and the edge information extracted from the input data. The second gradation processing means binarizes the input data processed with a relatively small gradation error such as the sub-matrix method or density pattern processing method. Then, the first gradation processing means is selected when the edge information is contained in the input data, whereas the second gradation processing means is selected when no edge information is contained in the input data. Accordingly, since the information containing edges such as of linear pictures and letters in the input image is to be processed by the first gradation processing means, a high resolution can be obtained. While on the other hand, since the information containing no edges is to be processed in the second gradation processing means, a high gradation can be obtained. Favorable reproduced image can thus be attained in both of the cases.

By the way, the existence of the edge information can be judged for general images by extracting the edge information from the input information, for example, by using a $3 \times 3$ filter of Laplasian type and judging the result of the extraction in a binary manner. However, in case of reading the image applied with mesh-point processing, erroneous judgement is liable to be caused by the processing described above.

Then, in this invention, averaging means for averaging the data of plurality of picture elements (for example, $2 \times 2$) is disposed to the input of the edge judging means that judges the existence of the edge information. In this way, the erroneous judgement described above is no more resulted even if the edge extraction filter is of $3 \times 3$ size.

In case of conducting the gradation processing by the density pattern method, an averaging circuit that produces an average value of all of the input data in a predetermined region is required. The operation of said averaging means for the edge judging means is identical with a portion of the operation in the averaging circuit for the density pattern method. The density pattern processing is carried out at the second gradation processing means and the input terminal of the processing means is connected to the output terminal of the averaging means for edge judging means in a preferred embodiment according to this invention. This can simplify the circuit structure of the second gradation processing means.

Figure 1:
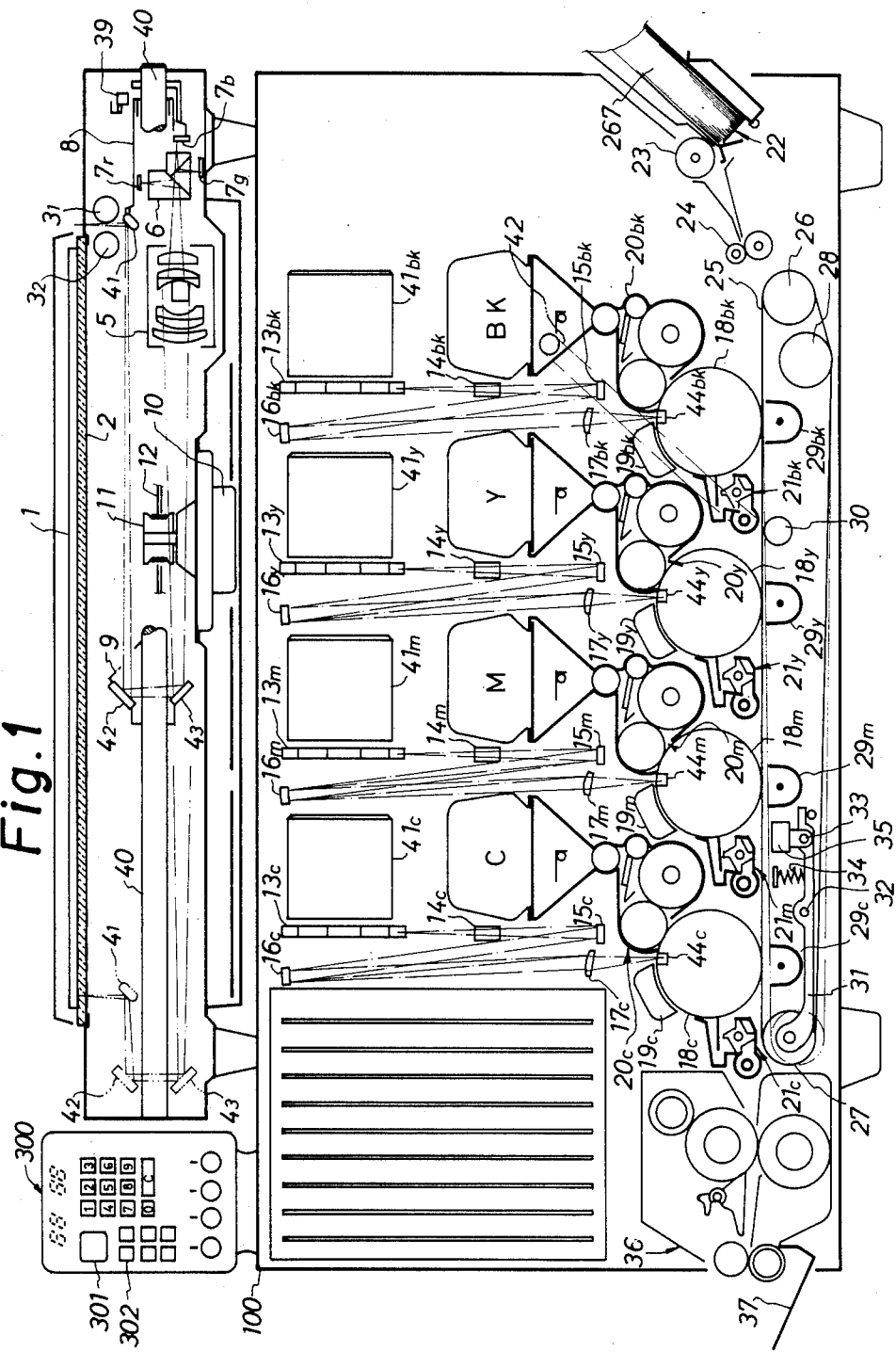
Figure 2:
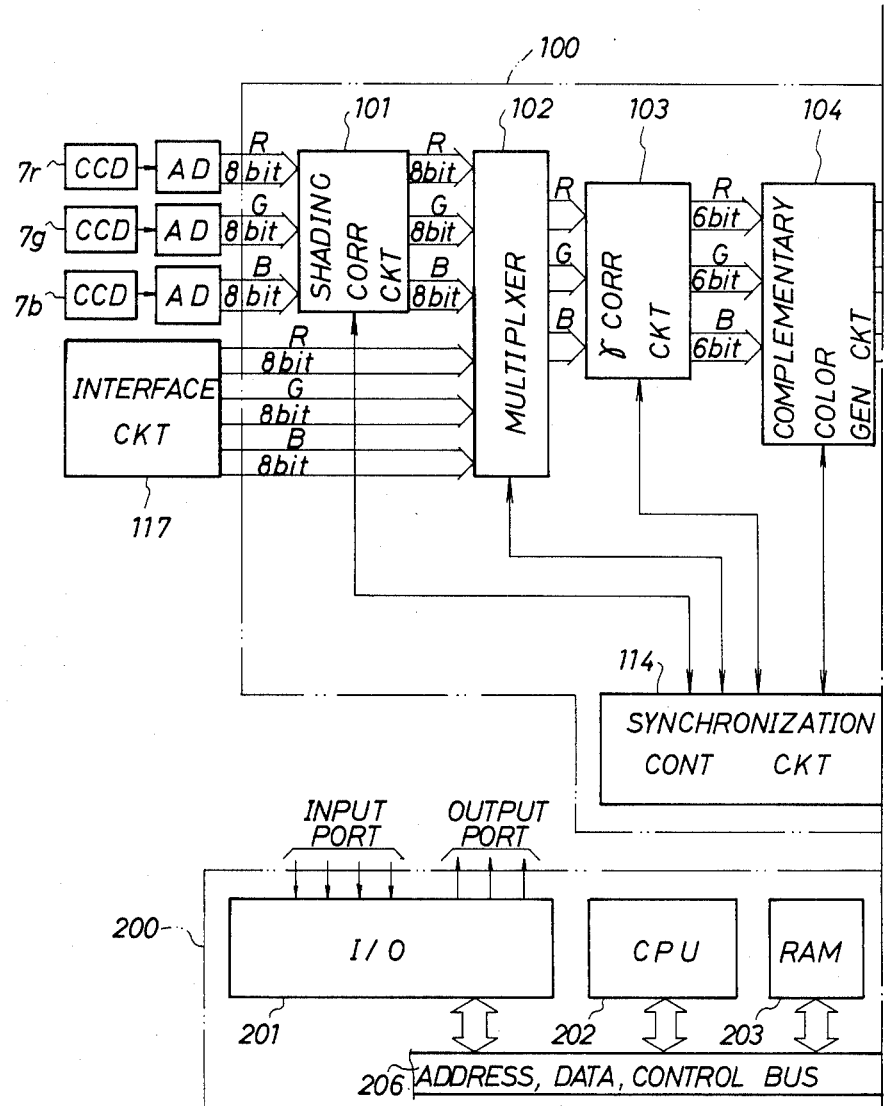
Figure 3:
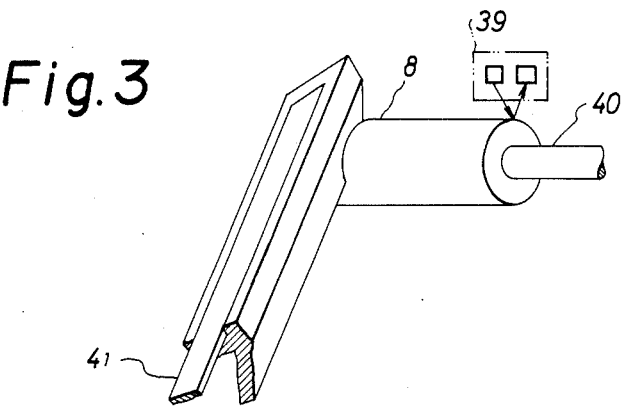
Figure 4:
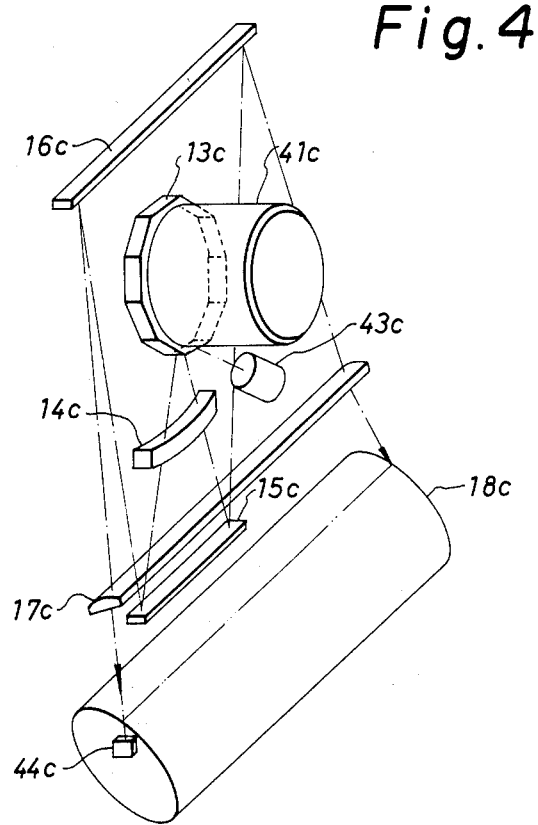
Figure 5:
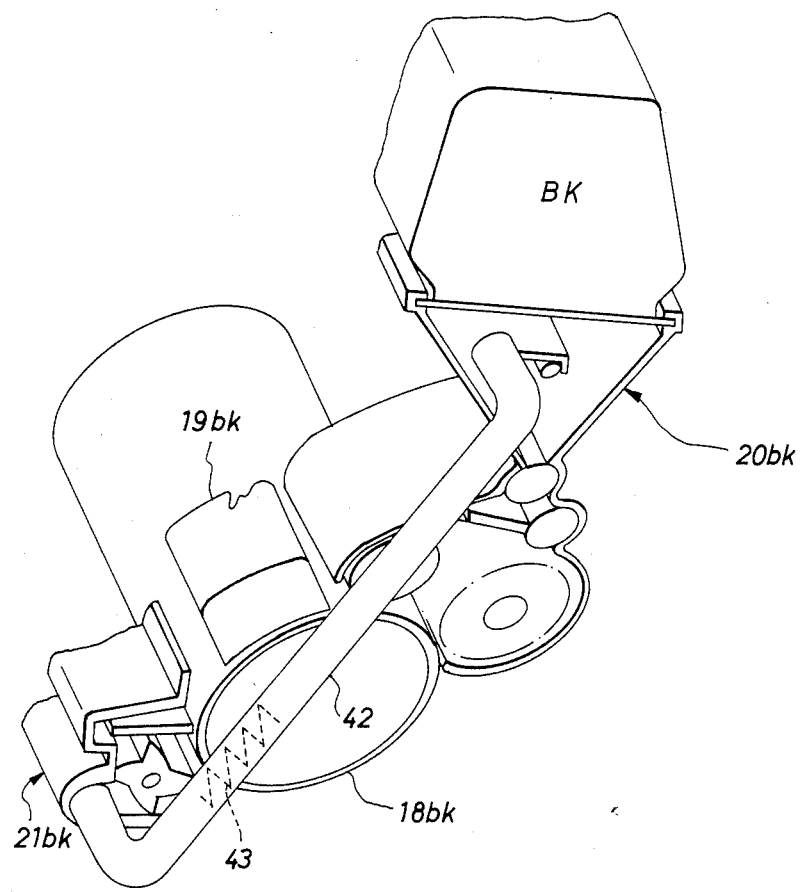
Figure 6:
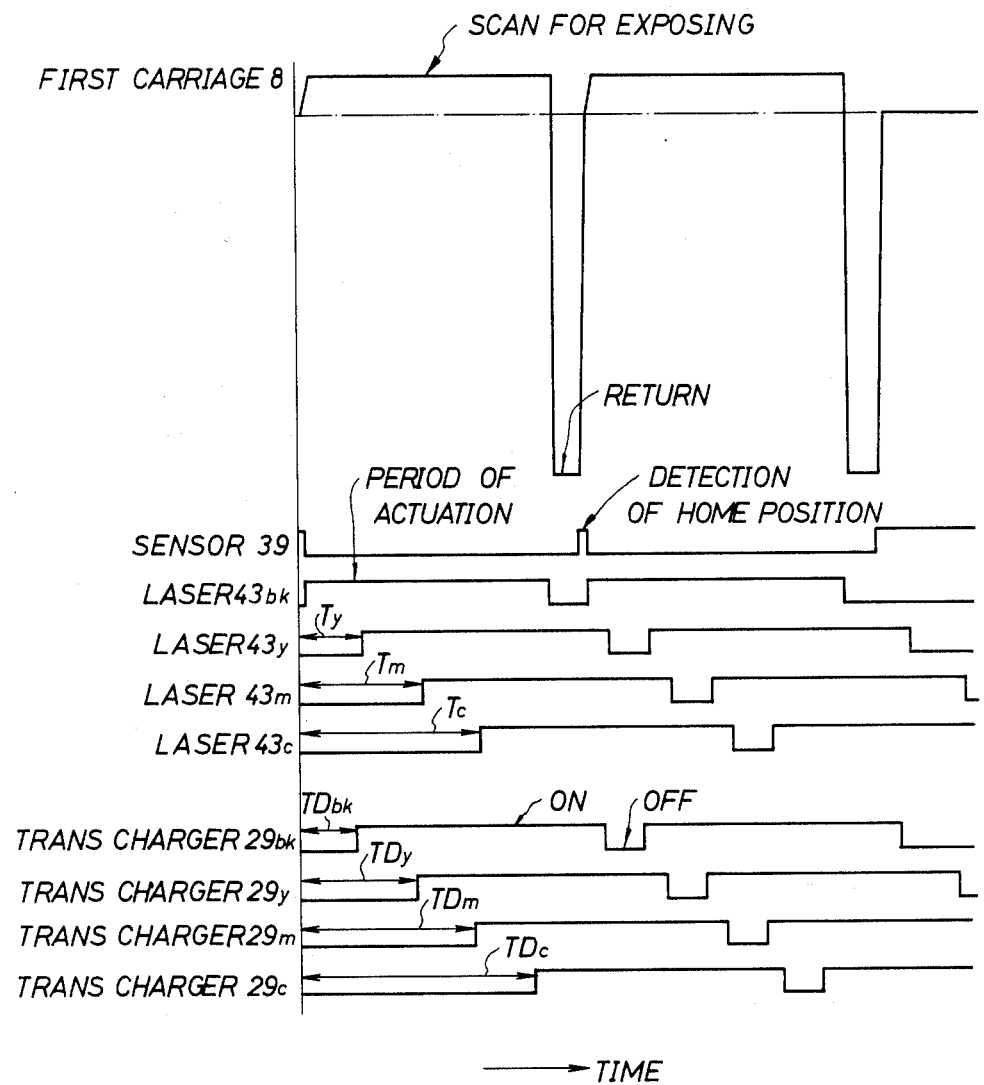

This invention will now be described referring to the accompanying drawings, by which the foregoing and other features, as well as the objects of this invention can be made more clear, wherein;

FIG. 1 shows the constitution of the main portion of mechanisms in one type of digital color copying machine for practicing this invention, FIGS. 2i and 2ii show the electric constitution of an image processing section, FIG. 3 is an enlarged perspective view for a portion of first carriage 8 shown in FIG. 1, FIG. 4 is a perspective view for a portion of BK recording device shown in FIG. 1, FIG. 5 is an enlarged perspective view of the BK recording device showing the toner recovery pipe, FIG. 6 is a time chart showing the relationship among the scanning timing of reading an original document, the actuation timing of recording and the actuation timing of the transfering in the above-mentioned embodiment.

Figure 8A:
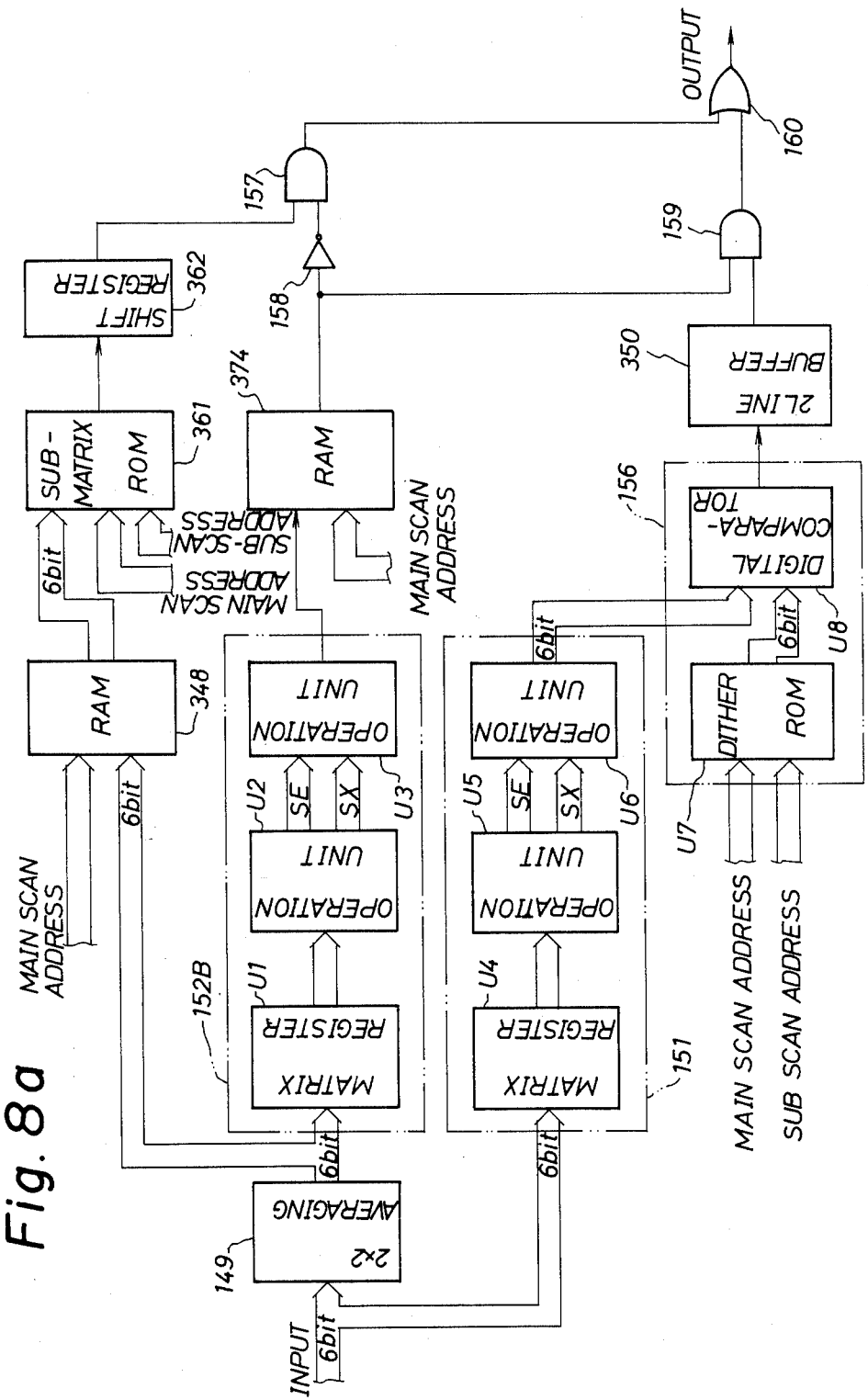
Figure 8B:
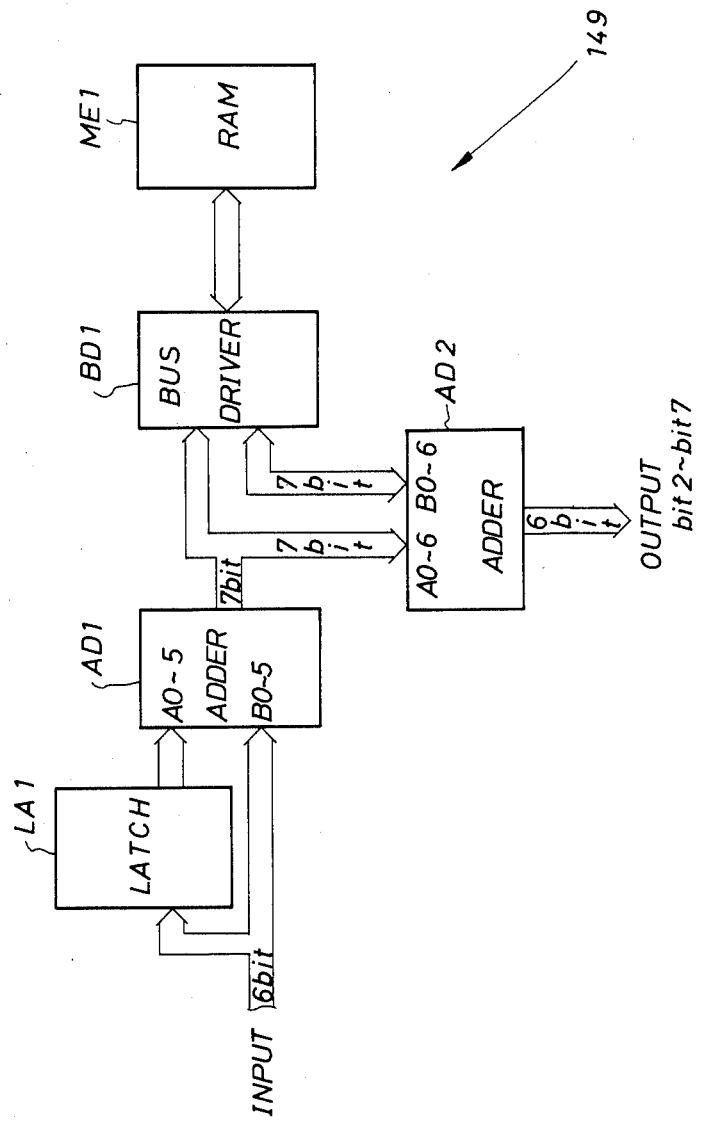
Figure 8C:
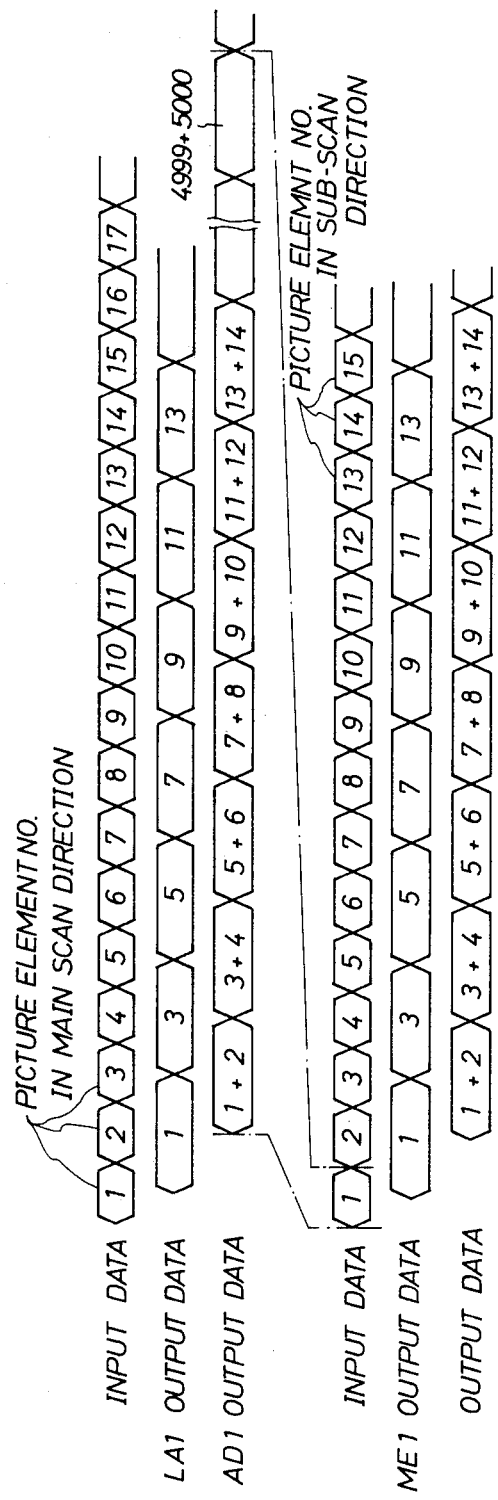
Figure 13:
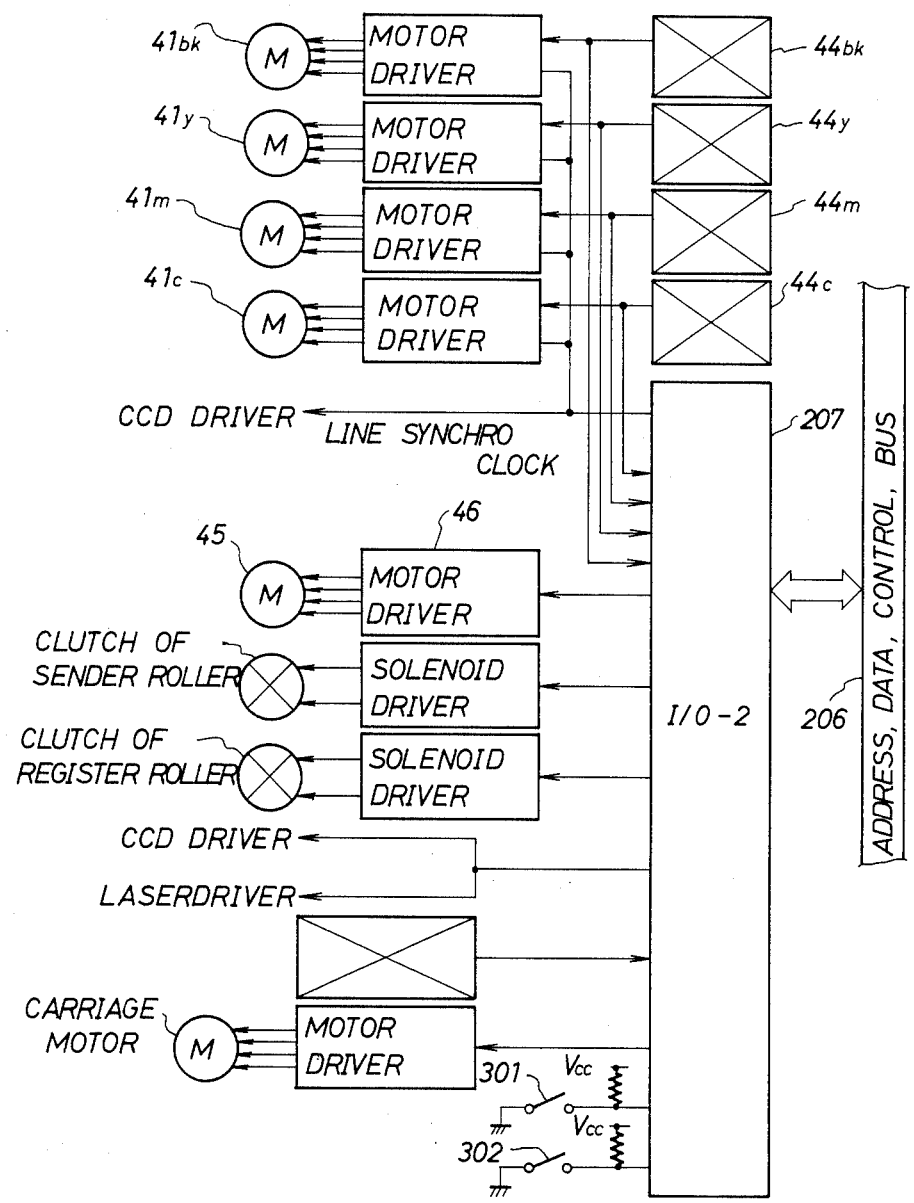
Figure 14:
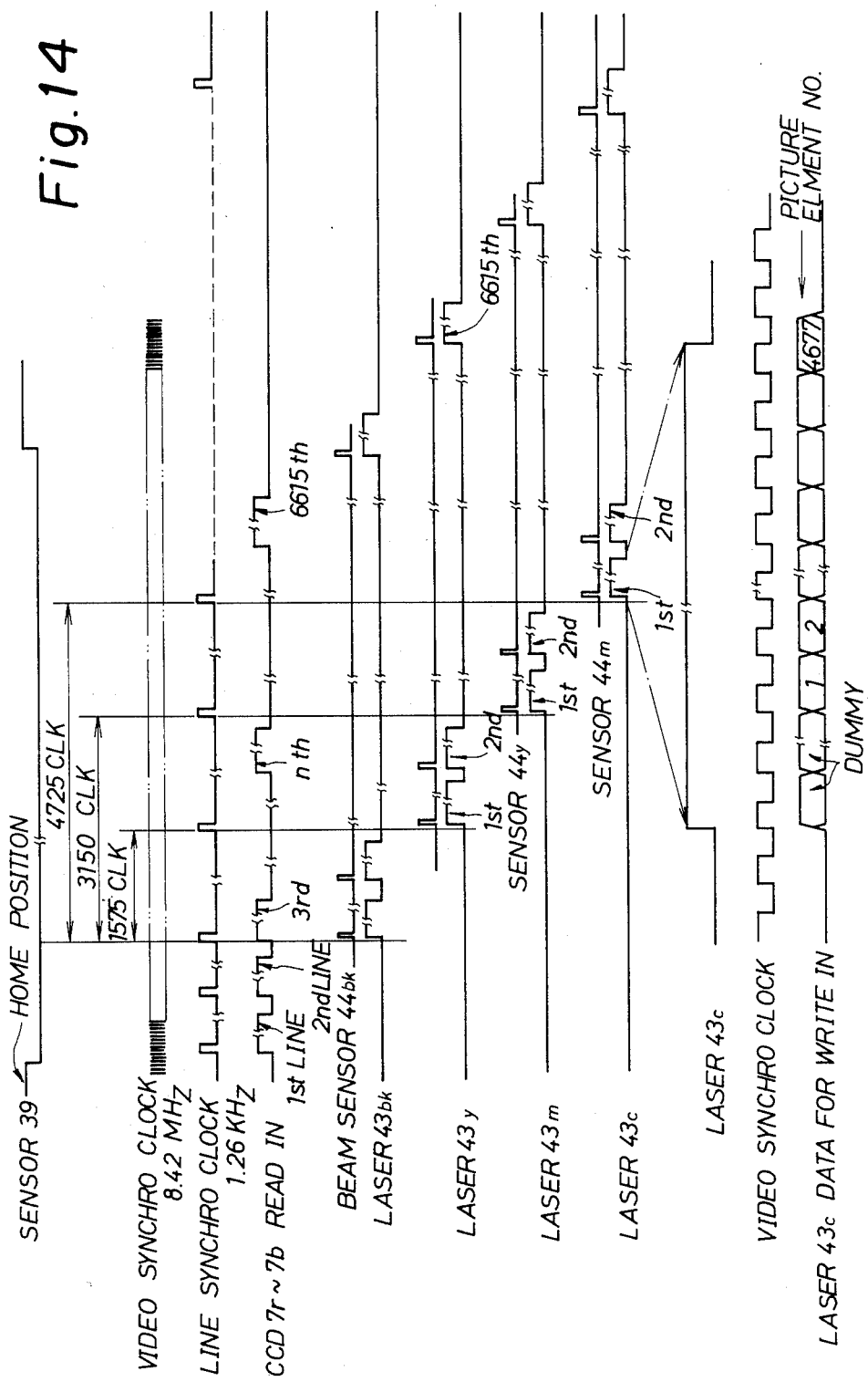
Figure 15A:
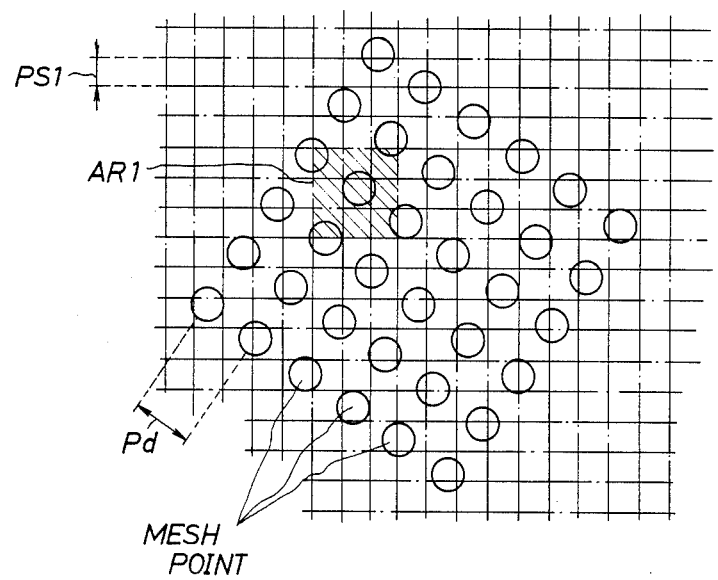
Figure 15B:
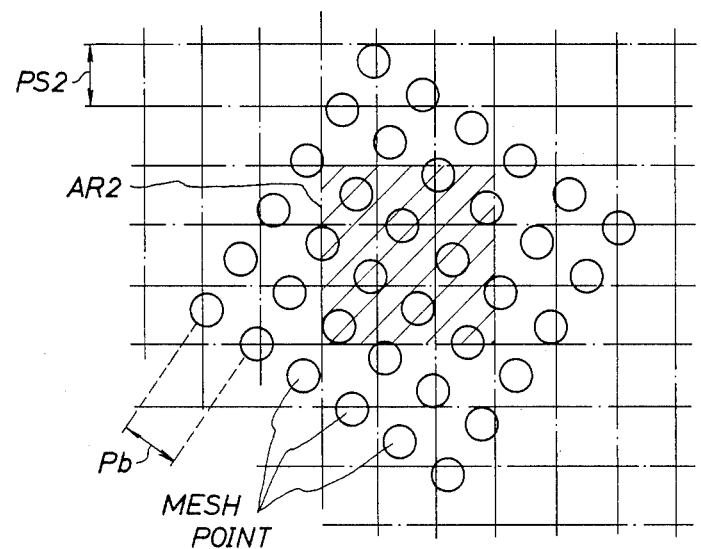
Figure 16:
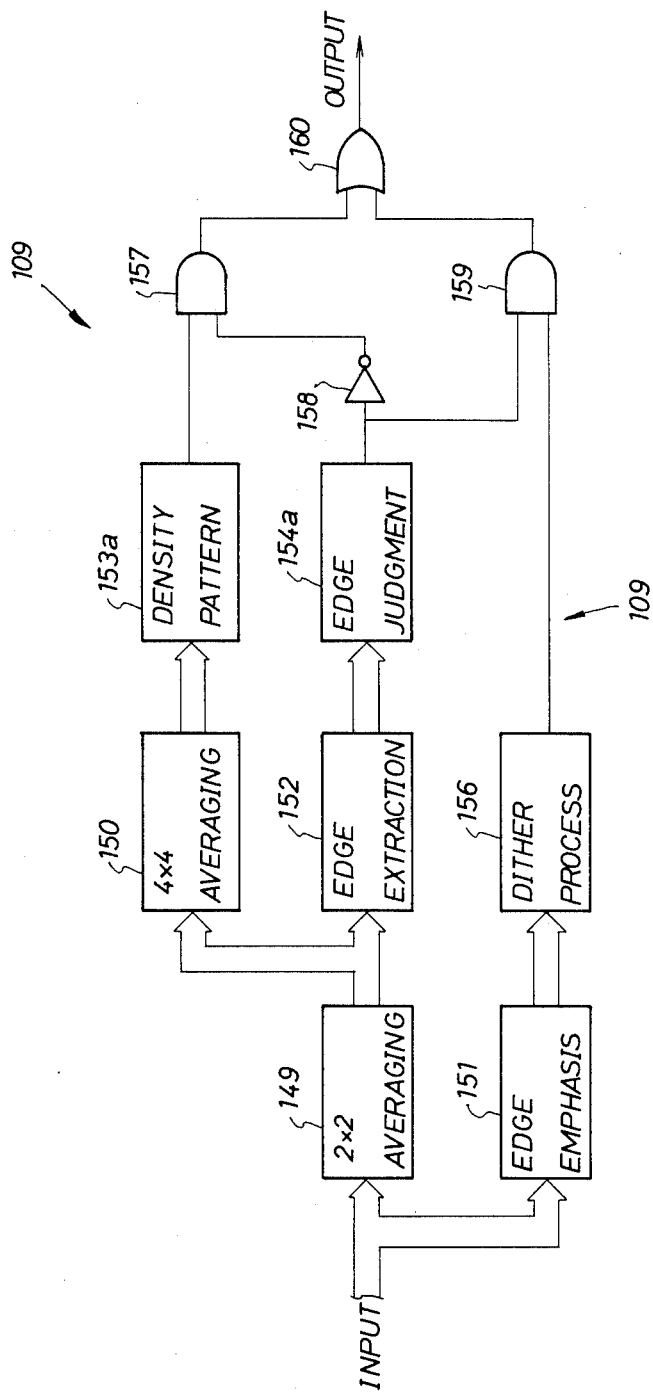
Figure 17H:
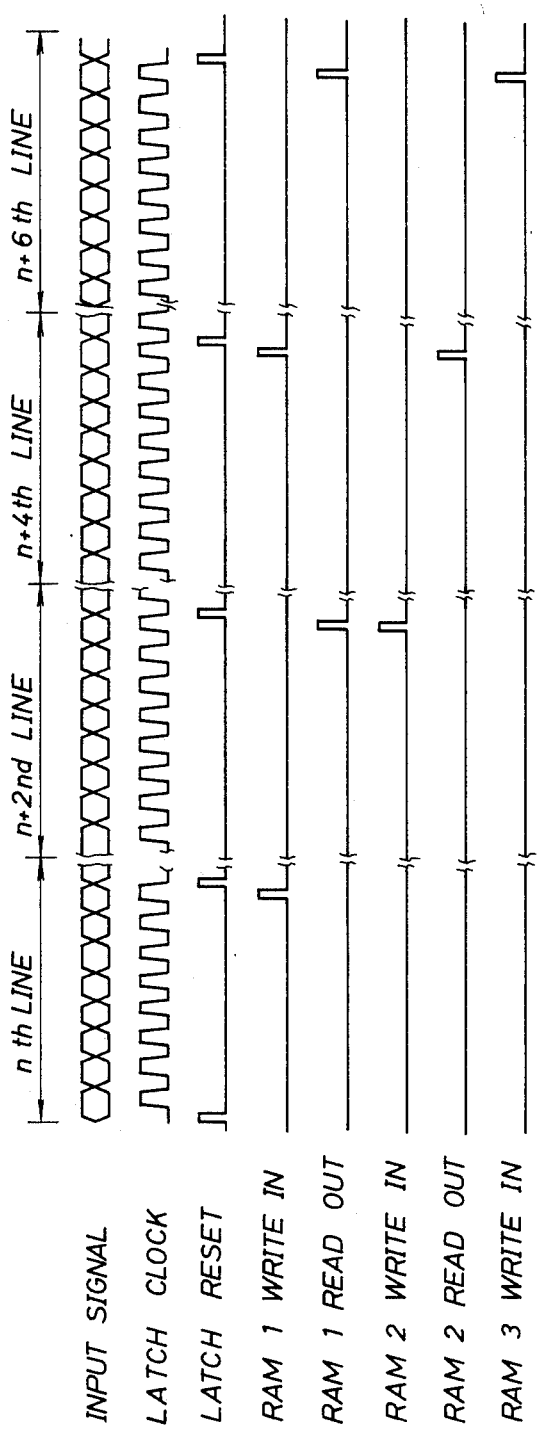
Figure 18:
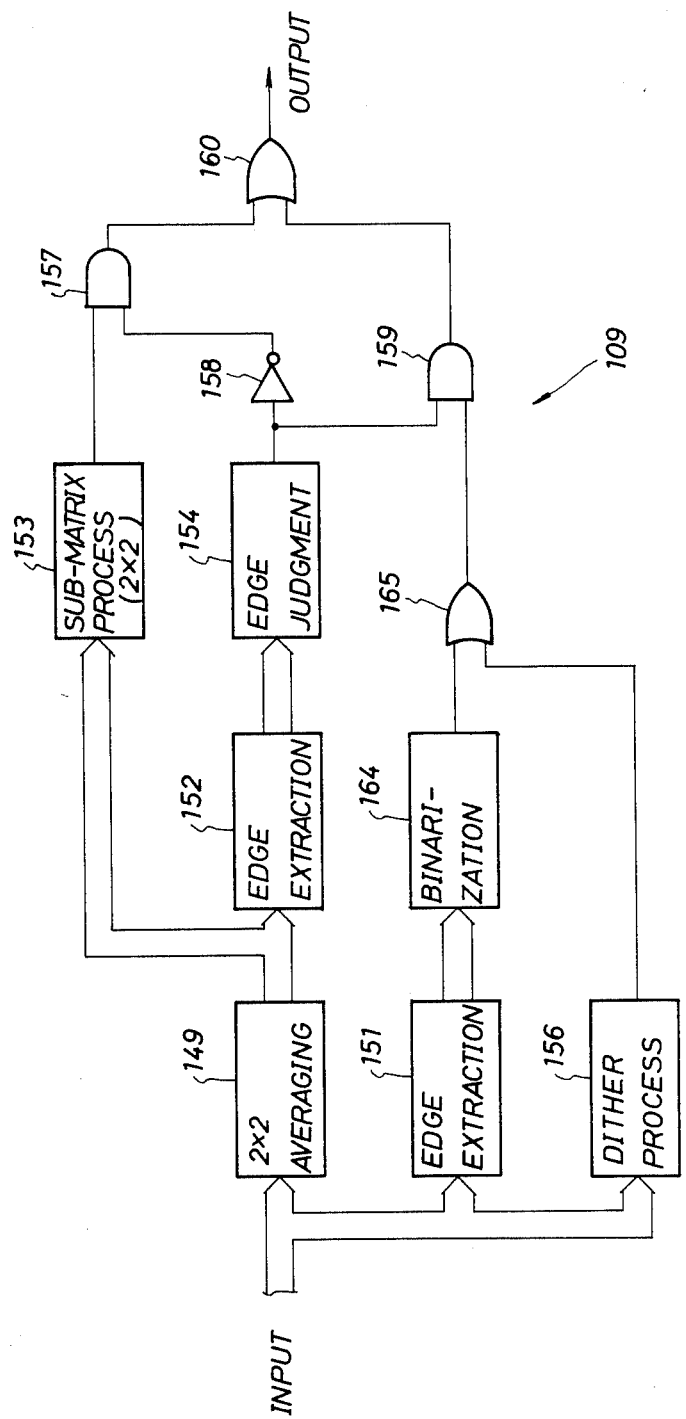
Figure 19:
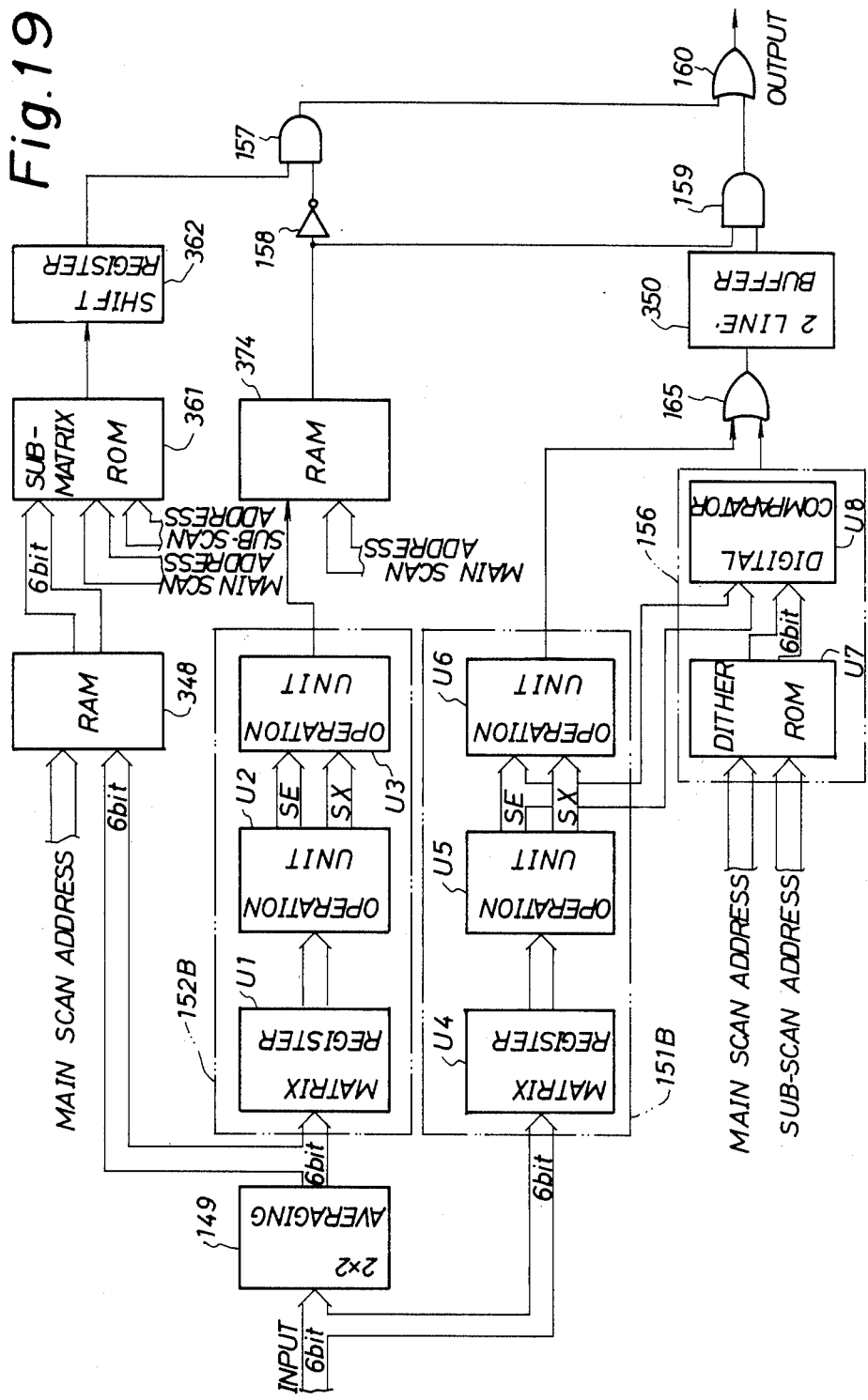

FIG. 7 shows the constitution of gradation processing circuit 109 shown in FIG. 2, FIGS. 8a, 8b, 8d and 8e show the constitution of each of the portions of the circuit shown in FIG. 7, FIG. 8c shows the data processing time sequence of circuit 149, FIGS. 9i and 9ii show the constitution of buffer memory 108c shown in FIG. 2, FIG. 10a is a plan view showing an example of a partial region of an original image corresponding to the unit region of the gradation processing, FIG. 10b shows the multi-value data obtained by reading the image of FIG. 10a developed in a 2-dimentional manner, FIGS. 10c, 10e and 11h show the contents of the three kinds of threshold value tables used in the gradation processing developed in a 2-dimensional manner, FIGS. 10d and 10f show the result of the dither processing of the data shown in FIG. 10b by utilizing the threshold value data in FIGS. 10c and 10e respectively developed in a 2-dimensional manner. FIG. 10g shows the result of the density pattern processing of the data in FIG. 10b by utilizing the threshold value data shown in FIG. 10e developed in a 2-dimensional manner, FIG. 10h shows the data as the result of averaging the data in FIG. 10b with every 2×2 region, FIGS. 10i and 10j show the data obtained by processing the data in FIG. 10h with the data in FIGS. 10c and 10e respectively, FIG. 10k shows the image in one main matrix and the content of the processing, FIG. 11a shows the state of arranging the data showing the feature of an edge on both sides of the edge region of the data shown in FIG. 10b, FIGS. 11b and 11d show the results of the edge extraction processing and the edge emphasis processing respectively for the data shown in FIG. 10b, FIG. 11c shows the result of binarizing the data in FIG. 11b with fixed threshold values, FIGS. 11e and 11f show the results of the dither processing of the data in FIGS. 11f and 11d respectively by utilizing the threshold values in FIGS. 10e and 10c, FIG. 11g shows the result of the logical sum operation between the data in FIG. 11c and the data in FIG. 11e, FIG. 11h shows a matrix table, FIG. 11i shows the result of the logical sum operation between the result of the dither processing of the data in FIG. 10b with the threshold value in FIG. 11h, and the data shown in FIG. 11c, FIG. 12 shows several types of patterns of the spatial filter, FIG. 13 shows a portion of elements of the copying mechanism connected to microprocessor system 200, FIG. 14 is a time chart illustrating the relationship between the exposure scanning and the recording actuation in the copying machine shown in FIG. 1, FIGS. 15a and 15b show the positional relationship between the mesh-points on an original document and the edge extraction filter, FIG. 16 shows a circuit corresponding to FIG. 7 in other embodiment according to this invention, FIGS. 17a and 17f show the details of the circuit shown in FIG. 16, FIG. 17a corresponds to FIG. 8a and FIGS. 17g and 17h illustrate the operation time charts of the circuits shown in FIGS. 17a and 17f, FIG. 18 shows a circuit corresponding to the circuit shown in FIG. 7 in a further other embodiment according to this invention, FIG. 19 shows the details of the circuit shown in FIG. 18.

Figure 20:
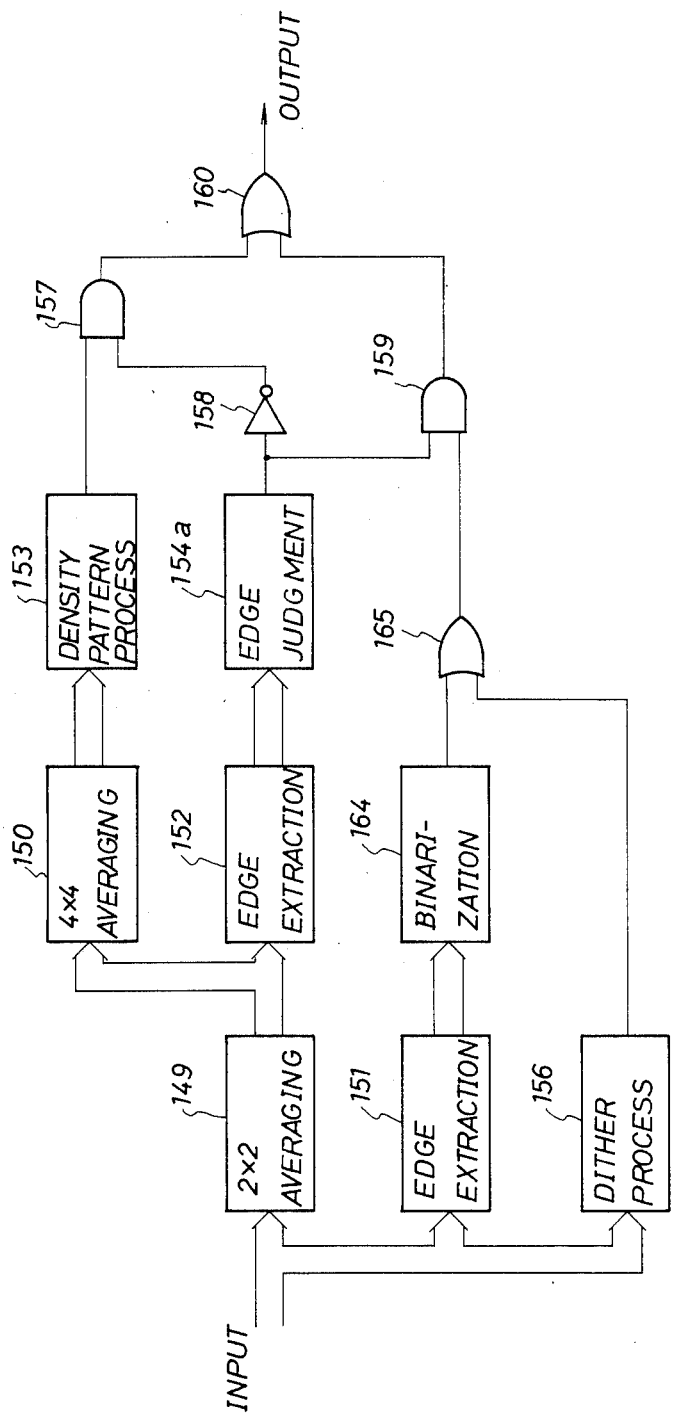
Figure 21:
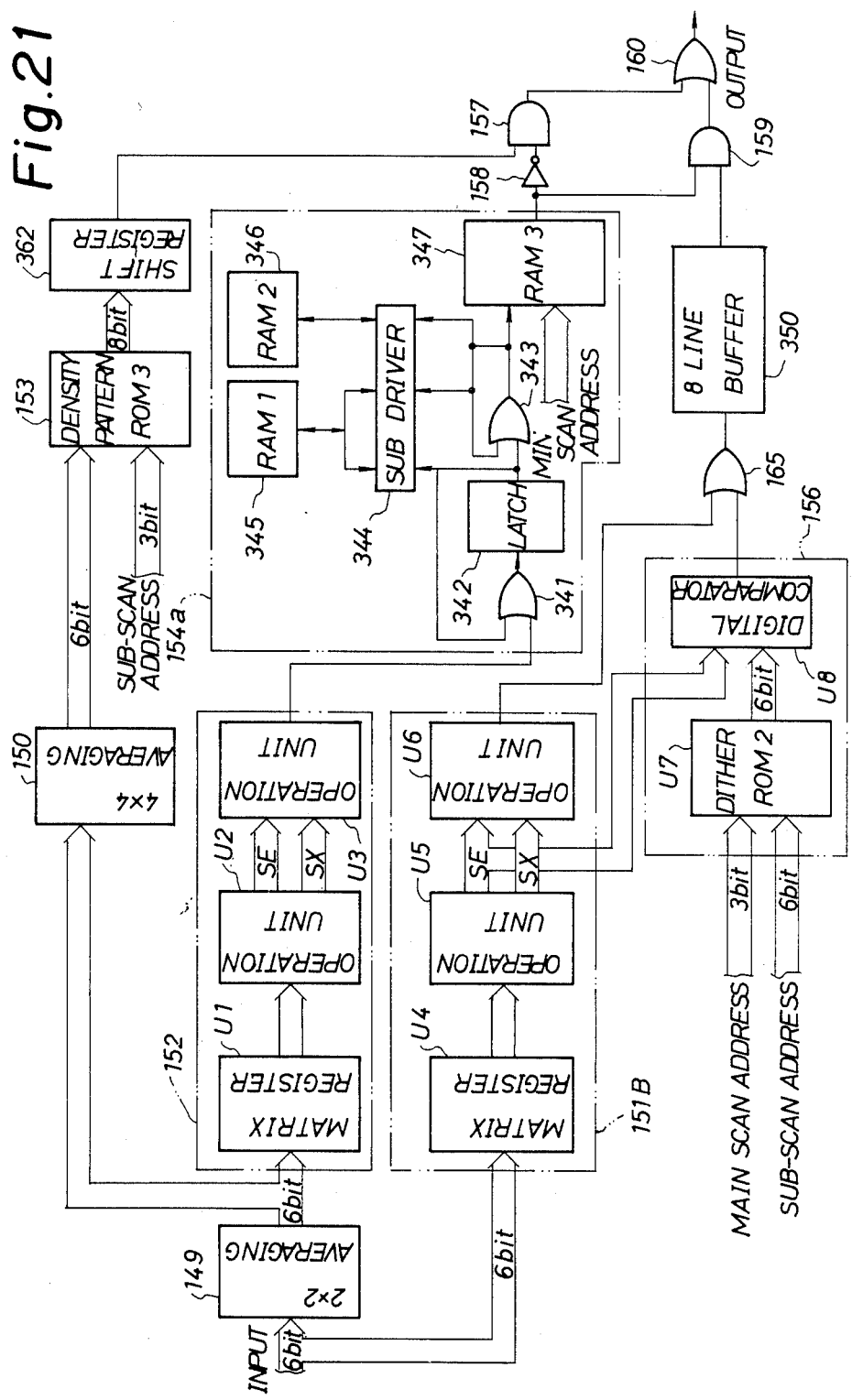

FIG. 20 shows a circuit corresponding to the circuit shown in FIG. 7 in a still further other embodiment according to this invention, and FIG. 21 shows the details of the circuit shown in FIG. 20.

In a general printed matter applied with meshpoint processing, the mesh-point pitch is about 100–175 line-/inch, while the sampling pitch of an image reading scanner used in the image processing apparatus is about from 300 to 400 dpi (dot per inch). Accordingly, the positional relationship between the mesh-points and each of the picture element data to be sampled is, for example, as shown in FIG. 15a (edge information is not contained). In FIG. 15a, PS1 is a sampling pitch and Pd is a mesh-point pitch. When the data obtained form FIG. 15a are passed through a 3×3 filter for edge extraction, since the density of the central noted picture element is approximately at the highest density, while the density of each of other peripheral picture elements is less than one-half of the highest density, for example, with respect to 9 picture elements within the region AR1 in FIG. 15a, an edge information is extracted although the original information contains no such edge information.

If the erroneous judgement of this kind is resulted, since edge emphasis is conducted also to the image which does not contain edge information, noise components at high spatial frequency are emphasized and appear to the entire output image and the image quality is degraded. The erroneous judgement is resulted in relation to the size of the edge extraction filter and the sampling pitch of the image data, which may be eliminated by increasing the number of elements of the edge extraction filter and adequately selecting the parameters. However, a filter comprising increased number of elements is extremely complicated in the structure and expensive.

In FIG. 15b, the data shown in FIG. 15a are divided into every four picture elements (one block) which are in adjacent with each other in the main scanning direction and the sub scanning direction. Accordingly, the pitch PS2 of the picture element block is twice as large as that of the pitch PS1. If each of the picture element blocks is corresponded to each of the elements of the edge extraction filter, the 9 picture element blocks noted by the filter comprise a region, for example, shown by AR2. In this case, since many mesh-points are allocated substantially equally to each of the elements of the filter, no edge information is extracted. Accordingly, no erroneous judgement is resulted.

Explanation will then be made to the specific content of the gradation processing. The gradation expression by the area gradation method can generally be classified into the density pattern method, the dither method and the sub-matrix method. In the density pattern method, the average density is determined with every predetermined processing region (for example, 8×8 picture elements), and the result is compared with each of the values in a threshold value table which previously defines threshold values with every picture elements in the processing region to generate "1" or "0" binary data with each of the picture elements according to the result.

In the dither method, the input data of each of the picture elements is compared directly with the value at a corresponded position in the threshold value table, to generate "1" or "0" binary data according to the result.

In the sub-matrix method, the average density of the input data is determined with every predetermined processing region (that is, sub-matrix: for example, of 2×2 picture elements) smaller than the matrix size of the gradation processing unit (for example, 8×8 picture elements) and the average density is compared with each of the threshold values at positions of four picture elements corresponding to the sub-matrix, to generate "1" or "0" binary data with every picture element according to the result.

In the case of 8×8 matrix table, 64 types of threshold values, 0, 2, 3, ... 62 and 63 are generally arranged at 64 picture element positions, and the order of arranging the threshold values, that is, the type of the pattern is generally classified into the dot concentrated type pattern and the dot dispersed type pattern. FIG. 10c typically represents the dot dispersed type pattern, which is referred to as a Bayer type. FIG. 10e typically represents the dot concentrated pattern, which is generally referred to as a vortex type.

Referring now to one example, FIG. 10a shows an original image corresponding to a 8×8 picture element region. In this case, the hatched portion is at a density of 44 and other portions are at a density of 14. That is, the figure shows a portion where the density changes abruptly along the slanting edge as the boundary. FIG. 10b shows the density data of every picture element read from the image in FIG. 10a.

FIG. 10d shows the result of processing the density data in FIG. 10b by the dither method using the dot dispersed type pattern shown in FIG. 10c, FIG. 10f shows the result processing the same density data by using the dot concentrated type pattern shown in FIG. 10e by the dither method, and FIG. 10g shows the result of processing by using the dot concentrated type pattern in FIG. 10c by the density pattern method. Hatched picture elements show data "1" (picture elements to be recorded) and other picture elements show data "0" (picture elements not to be recorded).

FIG. 10h shows the data obtained by averaging the data shown in FIG. 10b with every sub-matrix of 2×2 picture elements size, FIGS. 10i and 10j show the result of binarizing the data in FIG. 10h using the threshold value matrix in FIGS. 10c and 10e respectively, that is, the result of the processing by the sub-matrix method.

Now comparing the results for each of the processings, it can be seen that the dot concentrated type pattern excels the dot dispersed type pattern at the arrangement pattern of threshold value since the average density, that is, the gradation is 33 in FIG. 10d, 32 in FIG. 10f and 31 in FIG. 10g relative to 31.5 of the input data (FIG. 10b). In case of the sub-matrix method (FIGS. 10i and 10j), both of the patterns for arranging the threshold values are satisfactory.

Then, considering the state of arrangement of "1" and "0" in the 8×8 matrix, it can be seen that the distribution "1" and "0" is deviated along the edge of the original data as the boundary. That is, the information other than the density in the 8×8 matrix, that is, the information concerning the contour of the original data is reflected on the output data. However, it can be seen in FIGS. 10f, 10g and 10j that "1" is distributed at the center in accordance with the pattern of arranging the threshold values in the threshold value table in each of the cases, and the information for the contour of the original data scarcely appears in the output data. That is, it can be seen that the dot dispersed type pattern excels the dot concentrated pattern at resolution.

Accordingly, it is possible to satisfy both of the requirements of the resolution and the gradation by using a plurality of types of patterns selectively, for example, the dot dispersed type pattern is utilized to the picture image for which the resolution is important, while on the other hand, the dot concentrated type pattern is utilized to the image for which the gradation is important, etc. Since edge information, for example, as shown in FIG. 10a is contained in the image for which the resolution is important, a desirable type of pattern can be selected automatically by switching the type of the patterns in accordance with the existence of the edge in the images.

As described above, since the gradation difference between the original data and the output data is not so great even in a case of utilizing the dot dispersed type pattern, if information, for example, of a letter is inputted, at an intermediate tone, the gradation does not change greatly. That is, even in case of a letter information, for example, of multi-color, since the color can exactly be recorded and the resolution is high, the recorded letter can be distinguished with ease.

Upon distinguishing a letter or linear picture, the edge area of the information performs an important roll. That is, if the information of the edge region can be prevented from disappearance, the resolution can be substantially improved. For instance, for the image in FIG. 10a, by arranging "1" and "0" to those picture elements on both ends of the edge region, as shown in FIG. 11a, and by arranging 19 "1" to the lower side of the edge and 5 "1" to the upper side of the edge in the remaining picture element positions, the average density for the entire image is 32 which is equal to that of the original data, and the average density for each of the regions on both ends of the edge also approaches to that of the original data.

The edge region can be extracted by a spatial filter. For instance, it is equivalent to the function of the filter to assume a local region composed of 3×3 picture elements in adjacent with each other, apply weighting to each of the picture element positions A, B, C, D, E, F, G, H and I as shown in each of the patterns in FIG. 12 and output the total sum of the weighted data of each of the density data corresponding to the 9 picture elements. The characteristics of the spatial filter of this type are determined according to the weighting for each of the picture elements. The patterns PA, PB, PC, PD and PE of the filters shown in FIG. 12 function as an edge extraction filter, while other patterns PF, PG, PH, PI, and PJ function as an edge emphasizing filter.

FIG. 11b shows the result of processing the data shown in 10b by using the edge extraction filter of the pattern PD, while FIG. 11d shows the result of processing the data shown in FIG. 10b by using the edge emphasizing filter of the pattern PI. It should be noted here that the results are determined on the assumption that the density at the outside of the data of the end portion is identical with that of the data of the end portion for processing the data of the end portion of 8×8 picture elements in FIG. 10b. Further, in FIG. 11d, negative processing results are replaced with 0, while processing results of greater than 64 are replaced with 63 respectively.

FIG. 11c shows the result of binarizing the data in FIG. 11b with a fixed threshold value 32. Referring to FIG. 11c, it can be seen that the edge information of the image is extracted. However, since the average density in FIG. 11c (number of hatched picture elements) is 9, it is greatly different from the density 32 of the original data and can not be utilized as it is in view of the gradation.

Then, the logical sum for the result of the dither processing by using the threshold value table of the dot dispersed type pattern (FIG. 10d) and the result of FIG. 11c are calculated and shown in FIG. 11g. That is, the error in the average gradation is improved by synthesizing the results of the edge information and of the dither processing, by which the edge information is reliably reflected on the result of the processing.

FIG. 11e shows the binarized data by applying the dither processing to the data in FIG. 11d with the threshold value table in FIG. 10c (dot dispersed type pattern) and FIG. 11f shows the binarized data by applying the dither processing to the data in FIG. 11d with the threshold value table in FIG. 10e (dot concentrated type pattern). Referring to FIGS. 11e and 11f, it can be seen that the information of the density distribution of the original data (FIG. 10b) is reflected relatively remarkably on the "1" and "0" distribution in the 8×8 matrix. That is, resolution in the unit gradation processing region (8×8 picture elements) is improved by the edge emphasis processing. However, when comparing the average density, that is, the gradation, since it is 32 in FIG. 11e, while it is 25 in FIG. 11f, it is desirable to adopt the dot dispersed type pattern as the threshold value table.

FIG. 11h shows the pattern, in which the matrix size of the threshold value table is different from that described above. In this case, the table is set to 4×4 size and 16 kinds of threshold values are arranged in the dot dispersed type pattern in each of 16 picture element regions. In FIG. 11h, 4 threshold value tables are arranged continuously in order to correspond to 8×8 picture element regions. FIG. 11i shows the result of the logical sum operation between the dither processing for the data in FIG. 10b by using the threshold value table in FIG. 11h and the content in FIG. 11c. It can be seen from the result that the edge information of the original data is sufficiently reflected on the processing result and the average density in the 8×8 picture elements is 33 and thus the gradation is excellent.

It can be seen from the above considerations that both of the accurate gradation expression and the high resolution can be realized simultaneously by selecting preferred threshold value tables, or synthesizing a plurality of results of processings.

FIG. 1 shows constitutional components for the mechanical section of a digital color copying machine practicing this invention. FIG. 2 shows outline of electronic portion.

Referring at first to FIG. 1, an original document 1 is placed on a platen (contact glass) 2 and illuminated by illuminating fluorescent lamps $3_1$, $3_2$. The reflection of the light is reflected at movable first mirror $4_1$, second mirror $4_2$ and third mirror $4_3$, entered by way of imaging lens 5 into dichroic prism 6 and spectralized into colors of three different wavelengths, i.e., red (R), green (G) and blue (B). The spectralized lights enter CCD 7r, 7g and 7b which is solid state image pick-up devices respectively, that is, red light to CCD 7r, green light to CCD 7g and the blue light to CCD 7b respectively.

The fluorescent lamps $3_1$, $3_2$ and the first mirror $4_1$ are mounted on first carriage 8, while the second mirror $4_2$ and the third mirror $4_3$ are mounted on second carriage 9, the optical path length from the original document 1 to the CCDs is kept constant as the second carriage 9 moves at one-half speed of the first carriage 8, and the first and the second carriages are scanned from the right to the left upon reading an original image. The first carriage 8 is connected to carriage drive wire 12 wound around carriage drive pulley 11 secured to the shaft of carriage drive motor 10, and the wire 12 is wound around running pulley (not illustrated) on the second carriage 9. In such a mechanism, the first carriage 8 and the second carriage 9 move forwardly (upon scanning for reading the original image) and backwardly (upon returning) by the forward and backward rotation of the motor 10, and the second carriage 9 moves at one-half speed of the first carriage 8.

When the first carriage 8 is situated at the home position shown in FIG. 1, the first carriage 8 is detected by home position sensor 39 which is a reflection type photosensor. FIG. 3 shows the manner of detection. When the first carriage 8 is driven rightwardly upon exposure scanning and displaces out of the home position, the sensor 39 is put to a non-photoreceiving state (carriage is not detected), whereas the sensor 39 is put to a photoreceiving state (carriage is detected) when the first carriage 8 is returned to the home position upon returning operation, and the carriage 8 is stopped when the state of the sensor changes from the non-photoreceiving to the photoreceiving state.

Referring to FIG. 2, outputs from the CCDs 7r, 7g and 7b are put to analog/digital conversion by analog-digital convertor ADD, applied with necessary processings in image processing unit 100 and converted into binarized signals for the actuation of recording black (BK), yellow (Y), magenta (M) and cyan (C) respectively as color information to be recorded. The binarized signals are respectively inputted to laser drivers 112bk, 112y, 112m and 112c and laser beams modified with recording color signals (binarized signals) are outputted when the laser drivers energize semiconductor lasers 43bk, 43y, 43m and 43c respectively.

Referring again to FIG. 1, the generated laser beams are respectively reflected at rotational polygonal mirrors 13bk, 13y, 13m and 13 c, passed through f-θ lenses 14bk, 14y, 14m and 14c, reflected at fourth mirrors 15bk, 15y, 15m and 15c and fifth mirrors 16bk, 16y, 16m and 16c, further passed through cylindrical lenses 17bk, 17y, 17m and 17c for correcting the polygonal mirror inclination error and then focused onto photosensitive drums 18bk, 18y, 18m and 18c.

The rotational polygonal mirrors 13bk, 13y, 13m and 13c are secured to the rotating shafts of polygonal mirror driving motors 41bk, 41y, 41m and 41c respectively, and each of the motors rotates at a predetermined constant speed for rotationally driving each of the polygonal mirrors at a predetermined constant speed. By the rotation of the polygonal mirrors, the laser beams described above are scanned in the direction perpendicular to the rotating direction (clockwise direction) of the photosensitive drums, that is, in the direction along the drum axis.

FIG. 4 shows the details for the laser scanning system of a cyan color recording device. The semiconductor laser is shown by 43c. Sensor 44c comprising a photoelectronic conversion device is disposed in such a relation as receiving the laser beams at one end of the laser scanning along the axis of the photosensitive drum 18c (shown by the dotted chain). The sensor 44c detects the laser beams and the starting point for one line scanning is detected at an instance when the detection state changes from the detection state to the non-detection state. That is, detection signals of laser beam (pulses) from the sensor 44c are processed as line synchronizing pulses for the laser scanning. Magenta recording device, yellow recording device and black recording device are also constituted quite in the same manner with the cyan recording device shown in FIG. 4.

Further referring to FIG. 1, the surface of the photosensitive drum is uniformly charged by charge scorotrons 19bk, 19y, 19m and 19c connected to a high negative voltage generation device not illustrated. When the laser beams modified with the recording signals are irradiated on the surface of the uniformly charged photosensitive body, electric charges at the surface of the photosensitive body are moved to a portion of the drum main body connected to the common ground of the apparatus and eliminated by the photoconductive phenomenon. Here, the laser device is not put on for the high density area of the original document, whereas the laser device is put on for the low density area of the original document. Thus, the surface of the photosensitive drums 18bk, 18y, 18m and 18c corresponded to the high density area of the original document is set to a potential at $-800$ V, whereas the surface corresponding to the low density areas of the original document are set to about $-100$ V, by which electrostatic latent images are formed depending on the density of the original document. The electrostatic latent images are developed by black developing unit 20bk, yellow developing unit 20y, magenta developing unit 20m and cyan developing unit 20c respectively to form toner images of black, yellow, magenta and cyan on the surface of the photosensitive drums 18bk, 18y, 18m and 18c respectively. The toners in the developing units are positively charged by agitation and the developing units are biased to about $-200$ V by a developing bias generator not illustrated. The toners are deposited at the areas of the photosensitive body where the surface potential is higher than the developing bias to form toner images corresponding to the original document.

While on the other hand, recording paper 267 contained in transfer paper cassette 22 is delivered by the paper feeding operation of delivery roller 23 and then sent by regist roller 24 to transfer belt 25 at a predetermined timing. The recording paper placed on the transfer belt 25 passes below the photosensitive drums 18bk, 18y, 18m and 18c successively and toner images for each of black, yellow, magenta and cyan colors are successively transferred on the recording paper by the action of transfer corotrons below the transfer belt in the course where the recording paper passes over each of the photosensitive drums 18bk, 18y, 18m and 18c. The recording paper after the transfer is then sent to heat fixing unit 36 where the toners are secured on the recording paper and the paper is discharged to tray 37.

On the other hand, residual toners on the surface of the photosensitive body after the transfer are eliminated by cleaner units 21bk, 21y, 21m and 21c.

The cleaner unit 21bk for collecting the black toner is connected with the black developing unit 20bk by toner reclaiming pipe 42, so that the black toner collected in the cleaner unit 21bk is reclaimed to the developing unit 20bk. Since yellow, magenta and cyan toners collected in the cleaner units 21y, 21m and 21c are mixed with the toners of different color from the developing devices at the preceeding stages to these cleaner units, for example, by back-transfering of the black toner from the recording paper to the photosensitive drum 18y upon transfer, these toners are not reclaimed for re-use.

FIG. 5 shows the inside of the toner reclaiming pipe 42. The toner reclaiming pipe 42 contains in its inside toner reclaiming auger 43. The auger 43 is formed with a coil spring which is freely rotatable within the inside of the toner-reclaiming pipe 42 bent into a U-like configuration. The auger 43 is rotationally driven in one direction by driving means not illustrated, and the toners collected in the unit 21bk is sent to the developing unit 20bk by the spiral pumping action of the auger 43.

The transfer belt 25 for sending the recording paper from the photosensitive drum 18bk to the photosensitive drum 18c is laid around idle roller 26, drive roller 27, idle roller 28 and idle roller 30, and rotationally driven counterclockwise by the drive roller 27. The drive roller 27 is pivoted to the left end of lever 31 pivoted to shaft 32. To the right end of the lever 31, is pivoted a plunger 35 for a black mode setting solenoid not illustrated by way of shaft 33. A compression spring 34 is disposed between the plunger 35 and the shaft 32 and the spring 34 provides the lever 31 with the clockwise rotating tendency.

When the black mode setting solenoid is not energized (color mode), the transfer belt 25 carries the recording paper, the paper is brought into contact with the photosensitive drums 44bk, 44y, 44m and 44c to form toner images for each of the colors on the recording paper accompanied with the movement of the paper (color mode). When the color mode setting solenoid is energized (black mode), the lever 31 rotates counterclockwise against the resiliency of the compression spring 34 to lower the drive roller 27 by 5 mm, by which the transfer belt 25 is aparted from the photosensitive drums 44y, 44m and 44c, while the photosensitive drum 44bk is kept in contact with the belt. In this state, since the recording paper on the transfer belt 25 is brought into contact only with the photosensitive drum 44bk, only the black toner image is transferred on the recording paper (black mode). Since the recording paper is not brought into contact with the photosensitive drums 44y, 44m and 44c, toners deposited on the photosensitive drums 44y, 44m and 44c (residual toners) are not deposited to the recording paper and no contaminations due to yellow, magenta and cyan are resulted at all. That is, in the black mode reproduction, same copies as those in usual mono color black copying machine can be obtained.

Console board 300 is provided with copy start switch 301, color mode/black mode designation switch 302 (just after the power source has been put on, the switch key is put off to set color mode, upon first closure of the switch, the switch key is put on to set black mode, whereby the black mode setting solenoid is energized; upon second closure of the switch, the switch key is put off to set color mode, by which the black mode setting solenoide is deenergized), as well as other input key switches, character displays, pilot lamps, etc.

The operation timing of the main portion of the copying mechanism will be explained by referring to the time chart shown in FIG. 6. FIG. 6 shows the case where two sheets of identical full color copies are prepared. Modifying actuation for the laser 43bk due to the recording signal is started substantially at the same timing with the start of the exposure scanning of the first carriage 8, and modifying actuation for the laser beams 43y, 43m and 43c are started with the time delay Ty, Tm and Tc for displacement of the transfer belt 25 corresponding to the distance from the photosensitive drum 44bk to the photosensitive drums 44y, 44m and 44c respectively. The transfer corotrons 29bk, 29y, 29m and 29c are energized with the delay of predetermined times Tdbk, Tby, Tdm and Tdc behind the start of the modifying actuation of the laser beams 43bk, 43y, 43m and 43c (the times required for the laser irradiated portion of the photosensitive drum to reach the transfer corotron) respectively.

Referring to FIG. 2, the image processing unit 100 converts image signals of three colors read by the CCDs 7r, 7g and 7b to recording signals of black (BK), yellow (Y), magenta (M) and cyan (C) required for recording respectively. While the BK recording signal is applied as it is to the laser driver 112bk, Y, M and C recording signals are applied to the laser drivers 112y, 112m and 112c with time delays necessary for that the gradation data for the respective recording colors as the base each recording signals are once held in buffer memories 108y, 108m and 108c and then read out after the delay times Ty, Tm and Tc shown in FIG. 6 and converted into recording signals. While three color signals from the CCDs 7r, 7g and 7b are applied as described above to the image processing unit 100 in the copying machine mode, three colors signals are applied from the outside of the copying machine by way of external interface 117 in the graphics mode.

Shading correction circuit 101 in the image processing unit 100 applies correction to the color gradation data prepared by subjecting the output signals from the CCDs 7r, 7g and 7b to 8 bit A/D conversion, with respect to optical irregularity in the luminance, variety of sensitivity of unit elements inside of the CCDs 7r, 7g and 7b, etc, to thereby prepare color gradation data for reading.

A multiplexer 102 selects either the output gradation data from the correction circuit 101 or the output gradation data from the interface circuit 117.

Gamma-correction circuit 103 receiving the output (color gradation data) from the multiplexer 102 changes the gradation (input gradation data) according to the characteristics of the photosensitive body, as well as optionally changes the gradation by the operation button of the console 300 and further changes the input data of 8 bits into output data of 6 bits. Since the output is composed of 6 bits, it outputs the data indicating one of 64 gradations. Three color gradation data each composed of 6 bits indicating the respective gradation of red (R), green (G) and blue (B) outputted from the gamma-correction circuit 103 are applied to a complementary color formation circuit 104. The complementary color formation performs the change of the respective color reading signals into recording color signals, in which they are converted: red (R) gradation data into cyan (C) gradation data, green (G) gradation data into magenta (M) gradation data and blue (B) gradation data into yellow gradation data (Y) respectively.

The respective data for Y, M and C outputted from the complementary color formation circuit 104 are applied to masking circuit 106.

Explanation will be made to the masking processing and UCR processing. The calculation formula of the masking processing is generally represented as:

$$\begin{bmatrix} Yo \\ Mo \\ Co \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} Yi \\ Mi \\ Ci \end{bmatrix}$$

where:
Yi, Mi, Ci are data before masking,
Yo, Mo, Co are data after masking.

Further, the UCR processing is also represented by the general formula:

$$\begin{bmatrix} Yo' \\ Mo' \\ Co' \\ BKo' \end{bmatrix} = \begin{bmatrix} a_{11}' & a_{12}' & a_{13}' \\ a_{21}' & a_{22}' & a_{23}' \\ a_{31}' & a_{32}' & a_{33}' \\ a_{41}' & a_{42}' & a_{43}' \end{bmatrix} \begin{bmatrix} Yo \\ Mo \\ Co \end{bmatrix}$$

Accordingly, in this embodiment, new coefficients are determined by the product of these coefficients as:

$$\begin{bmatrix} Yo' \\ Mo' \\ Co' \\ BKo' \end{bmatrix} = \begin{bmatrix} a_{11}' & a_{12}' & a_{13}' \\ a_{21}' & a_{22}' & a_{23}' \\ a_{31}' & a_{32}' & a_{33}' \\ a_{41}' & a_{42}' & a_{43}' \end{bmatrix} \begin{bmatrix} a_{11} & a_{12} & a_{13} \\ a_{21} & a_{22} & a_{23} \\ a_{31} & a_{32} & a_{33} \end{bmatrix} \begin{bmatrix} Yi \\ Mi \\ Ci \end{bmatrix} =$$

$$\begin{bmatrix} a_{11}'' & a_{12}'' & a_{13}'' \\ a_{21}'' & a_{22}'' & a_{23}'' \\ a_{31}'' & a_{32}'' & a_{33}'' \\ a_{41}'' & a_{42}'' & a_{43}'' \end{bmatrix} \begin{bmatrix} Yi \\ Mi \\ Ci \end{bmatrix}$$

The coefficients ($a_{11}''$, etc) for the above-mentioned calculation formula which simultaneously carries out both of the masking processing and UCR-black generation processing are previously calculated and substituted into the above-mentioned calculation formula, and calculation values (Yo', etc: outputs from the UCR processing circuit 107) corresponded to the inputs Yi, Mi and Ci (each 6 bit) of the masking circuit 106 are previously stored in ROM. Accordingly, in this embodiment, the masking circuit 106 and the UCR processing-black generation circuit 107 are constituted with a set of ROMs, and the data of the address specified by the inputs Y, M and C to the masking circuit 106 are applied to the buffer memories 108y, 108m and 108c and the gradation processing circuit 109 as the output of the UCR processing-black generation circuit 107. Generally speaking, the masking circuit 106 corrects the Y, M and C signals in accordance with the characteristics of the spectrally reflecting wavelength of the toners for forming images, and the UCR processing circuit 107 corrects the color balance in the overlapping for each of the color toners. When the signals are passed through the UCR processing and black generation circuit 107, the data BK of black component is formed due to the synthesis of inputted Y, M and C three color data, and the data of each of the outputted Y, M and C color components are corrected as the values subtracted with the data of the black component.

Explanation will be made to the buffer memories 108y, 108m and 108c in the image processing unit 100. They merely generate time delays corresponding to the distance between the photosensitive drums. While writing for each of the memories are conducted at an identical timing, the timings for reading out are different from each other. Referring to FIG. 6, reading is conducted along with the timing of the modifying actuation of the laser 43y for the memory 108y, along with the timing of the modifying actuation of the laser 43m for the memory 108m and along with the timing of the modifying actuation of the laser 43c for the memory 108c respectively. Assuming A3 size as the maximum size, the capacity of each of the memories is at least of about 24% for the memory 108y, about 48% for the memory 108m and about 72% for the memory 108c of the capacity required for A3 size document. For example, assuming the reading picture element density read by CCD, as 400 dpi (dot/inch: 15.75 dot/mm), the capacity required for the memory is about 87K bytes for the memory 108y, about 174K bytes for the memory 108m and about 251K bytes for the memory 108c. Since 64 steps of gradation of 6 bits data are processed in this embodiment, the capacities for the memories 108y, 108m and 108c are 87K, 174K and 251K bytes respectively. The capacity of memory address is calculated as the 6 bit unit from the byte unit (8 bit) as: $116K \times 6$ bit for the memory 108y, $232K \times 6$ bit for the memory 108m and $348K \times 6$ bit for the memory 108c.

FIG. 9 shows the constitution of the memory 108c having the greatest capacity. Other memories 108y and 108m have substantially identical constitutions except for the reduction in the memory capacity.

Referring to the outline of the memory constitution in conjunction with FIG. 9, 36 memories of $64K \times 1$ bit are used as input data memories to constitute a $348K \times 6$ bit memory, which are shown as DRAMs 1-6 illustrated in FIG. 9.

The data after the completion of the UCR processing are written into FiFo RAMs 1 and 2 which are first in/first out (FiFo) memories. They are used for amending the deviation between the output timing for the output data from the UCR processing and the writing timing for the memories DRAMs 1-6, which constitute about one line buffer. The data written into the FiFo RAMs 1 and 2 are written into DRAMs 1-6 at the addresses successively determined from the 0 address by the counter COUNT 1. Then, the address designated by the counter COUNT 1 is incremented by one and the next data are written. In this way, the data are successively written into DRAMs 1-6 and reset when they reach 384K, and again written from the 0 address. When the address is advanced to 384K from the start of the writing by the counter COUNT 1, the data are started to write from DRAMs 1-6 to the FiFo RAMs 1 and 2 (reading from DRAMs 1-6). Upon starting the writing, the counter COUNT 2 is reset and the data at the 0 address are at first written into the FiFo RAMs 1 and 2. Then, the counter COUNT 2 is incremented by 1 and the data are thus read out successively in the same manner as in the writing. Also the counter COUNT 2 is reset when it reaches 384K and the writing is started from the 0 address. The data written into the FiFo RAMs 1 and 2 are outputted to the gradation processing circuit 109 based on the synchronization signal from the laser driver 112c. Data selector DSELT 1 selects either one of the address (count data) of the counter COUNT 1 or the counter COUNT 2, in which the address data of the counter COUNT 1 are outputted to DRAMs 1-6 upon data writing, whereas the address data of the counter COUNT 2 are outputted upon data reading.

Data selector DSELT 2 is used for the upper/lower selection of 16 bits addresses since the addresses of the DRAMs 1-6 of $64K \times 1$ bit are determined by multiplexing upper 8 bits and lower 8 bits. Further, the decoder is an address decoder for selecting 6 blocks of DRAMs 1-6 with every 64K for 384K addresses in total.

Explanation will then be made to the gradation processing circuit 109 in the image processing unit 100. The circuit 109 serves to convert the respective multi-value input data for Y, M and C into binary data and it performs area gradation processing for reflecting the gradation of the input data on the output data.

The 6 bit gradation data can represent the density information at 64 steps of gradation. It will be ideal if the diameter for one dot can be varied over 64 steps since the resolution is not reduced. However, since the gradation can be stable only for about 4 steps at most regarding the modification of the dot diameter in the laser beam electrophotographic system, the area gradation method or the combination of the area gradation method with the beam modification has generally been employed. In this embodiment, intermediate tone expression for 64 steps of gradations is performed by conducting the area gradation processing on every $8 \times 8$ picture element matrix.

The gradation processing circuit 109 comprises 4 sets of units for processing the data for each of Y, M, C and BK color components. The constitution of each of the units is substantially identical. FIG. 7 shows the schematic structure for one of them and the details for each of the circuits are shown in FIGS. 8a, 8b, 8c, 8d and 8e.

Referring at first to FIG. 7, the circuit comprises $2 \times 2$ averaging circuit 149, edge emphasis circuit 151, edge extraction circuit 152, sub-matrix processing circuit 153, edge judging circuit 154, dither processing circuit 156 and the like.

Generally speaking, the gradation processing unit comprises two types of gradation processing systems, in which either one of the processing systems is automatically selected according to the state of the input data. The first processing system comprises the $2 \times 2$ averaging circuit 149 and the sub-matrix processing circuit 153. In this processing system, the gradation processing is conducted by the sub-matrix method. This embodiment uses a region comprising each 8 picture elements continuous in the main scanning direction and the sub-scanning direction, that is, an $8 \times 8$ matrix region is considered as one unit for the gradation processing, and expresses one gradation by 64 picture elements.

In the sub-matrix processing of this embodiment, the average density of the input data of 4 picture elements is determined on every region of $2 \times 2$ picture elements disposed in adjacent with each other in the main scanning direction and the sub-scanning direction for image reading, that is, on every sub-matrix region, the magnitude of the thus determined average density is compared with 4 threshold values in a threshold value matrix table ($8 \times 8$) corresponding to the above-mentioned sub-matrix region respectively, and binary data of "1" or "0" are formed depending on the result of the comparison. Since the value of the average density of the $2 \times 2$ picture elements required in the submatrix processing is obtained at the output from the $2 \times 2$ averaging circuit 149, the input of the sub-matrix processing circuit 153 is connected to the output terminal of the $2 \times 2$ averaging circuit 149, thereby saving the operation of calculating the average density in the processing circuit 153.

The second gradation processing system comprises the edge emphasis circuit 151 and the dither processing circuit 156 connected to the output terminal thereof. That is, the data inputted in the form of multi-value data are subjected to the edge emphasizing correction and then converted into binary data containing the gradation information by the dither processing. In the dither processing, each of the input data on the picture element unit is subjected to 1:1 comparison with the threshold values in the threshold value matrix table 8×8 at the corresponding positions, and binary data "1" or "0" is outputted according to the magnitude therebetween.

The edge extraction circuit 152 and the edge judging circuit 154 outputs binary signals as to whether the edge information is contained or not in the input data. A circuit composed of four logic gates 157, 158, 159 and 160 selectively outputs either the output data from the first gradation processing system or the second gradation processing system according to the existence of the edge information.

In the circuit shown in FIG. 7, only the outline of main constituent elements is shown for the easy understanding of the operation. FIG. 8a shows a more specific constitution for the circuit shown in FIG. 7. The specific constitution of the 2×2 averaging circuit 149 in FIG. 8a is shown in FIG. 8b and the outline of the operation timing thereof is shown in FIG. 8c.

What are averaged in the averaging circuit 149 are: 2 picture element data in the sub-scanning direction (the exposure scanning direction of the first carriage 8) ×2 picture element data in the main scanning direction (direction in perpendicular to the exposure scanning direction:scanning direction of the CCD electronic circuit), that is, 4-picture elements in total which are present at positions in adjacent with each other on the image. Referring to FIG. 8b, the averaging circuit 149 comprises latch LA1, adders AD1 and AD2, bus driver BD1, read/write memory (RAM) ME1 and the like.

The operation of the averaging circuit 149 is explained. At the input to the circuit, the data of the picture elements in adjacent with each other in the main scanning direction appear successively as serial signals. As shown in FIG. 8c, each of the odd number data (1, 3, 5, —) of the picture element data in the main scanning direction is held by the time for about 2 picture elements in the latch LA1. Accordingly, the odd number data is applied to bits 0-5 at one input terminal A of the adder AD1 and even number data (2, 4, 6, —) appearing next to the above-mentioned data is directly applied to the bits 0-5 at the other input terminal B of the adder AD1. Accordingly, just after the inputting of the even number data, the sum of the odd number data and the even number data (1+2, 3+4, 5+6, —) appears at the output of the adder AD1. For the odd number picture elements in the sub-scanning direction (whole 1 line), the data are stored by way of the bus driver BD1 to the memory ME1. For the even number picture element in the sub-scanning direction (whole 1 line), the sum of the two picture element data in adjacent with each other in the main scanning direction on the line is applied to the bits 0-6 at the input terminal A of the adder AD2, at the same time, the data of the picture element situated just before the line in the sub-scanning direction (the sum of the 2 picture element data in the main scanning direction) is read out from the memory ME1 and applied to the bits 0-6 at the input terminal B of the adder AD2. Accordingly, when expressing each of the picture elements by D (i,j) (i represents the position in the sub-scanning direction and j represents the position in the main scanning direction), the adder AD2 outputs the result of the operation: D(n, m)+D(n, m+1), D(n+1, m)+D(n+1, m+1), that is, the total sum of the data for 4 picture elements (2×2) in adjacent with each other. Then, the ¼ value for the total sum, that is, the average value for 4 picture elements can be obtained by neglecting the lower 2 bits (0, 1) and taking out the upper 6 bits (2-7) from the output of the adder AD2.

Referring again to FIG. 8a, the edge extraction circuit 152 comprises matrix register U1 and operation units U2 and U3, while the edge emphasis circuit 151 comprises matrix register U4 and operation units U5 and U6.

The edge emphasis circuit 151 is a 2-dimensional space filter, which amplifies the change in the density of data in the region if the density level changes in the input data, that is, if there is any edge information, it emphasize the edge. In this example, pattern PI in FIG. 12 is utilized. That is, a 3×3 picture element matrix region comprising A, B, C, D, E, F, G, H and I is assumed, and the data of the central picture element (noted picture element) E is replaced with E' represented by the following formula:

$$E' = 13.E - 2(B+D+F+H) - (A+C+G+I)$$

In this processing, values deviated from the range 0-63 may be resulted, and those of 64 or greater than 64 are replaced with fixed value 63, while those of negative values are replaced with 0. For instance, when the data shown in FIG. 10b are inputted to the edge emphasis circuit 151, data shown in FIG. 11d are obtained at the output thereof.

In order to constitute a spatial filter of 3×3 picture element matrix, all of the 2-dimensional data for 3×3 picture elements have to be referred to at the same timing. However, since the data are inputted to the filter along a time sequence, it is necessary to coincide the time at which the data for the 9 picture elements appear at the filter. For this purpose the matrix register U4 is provided.

Figure 8D:
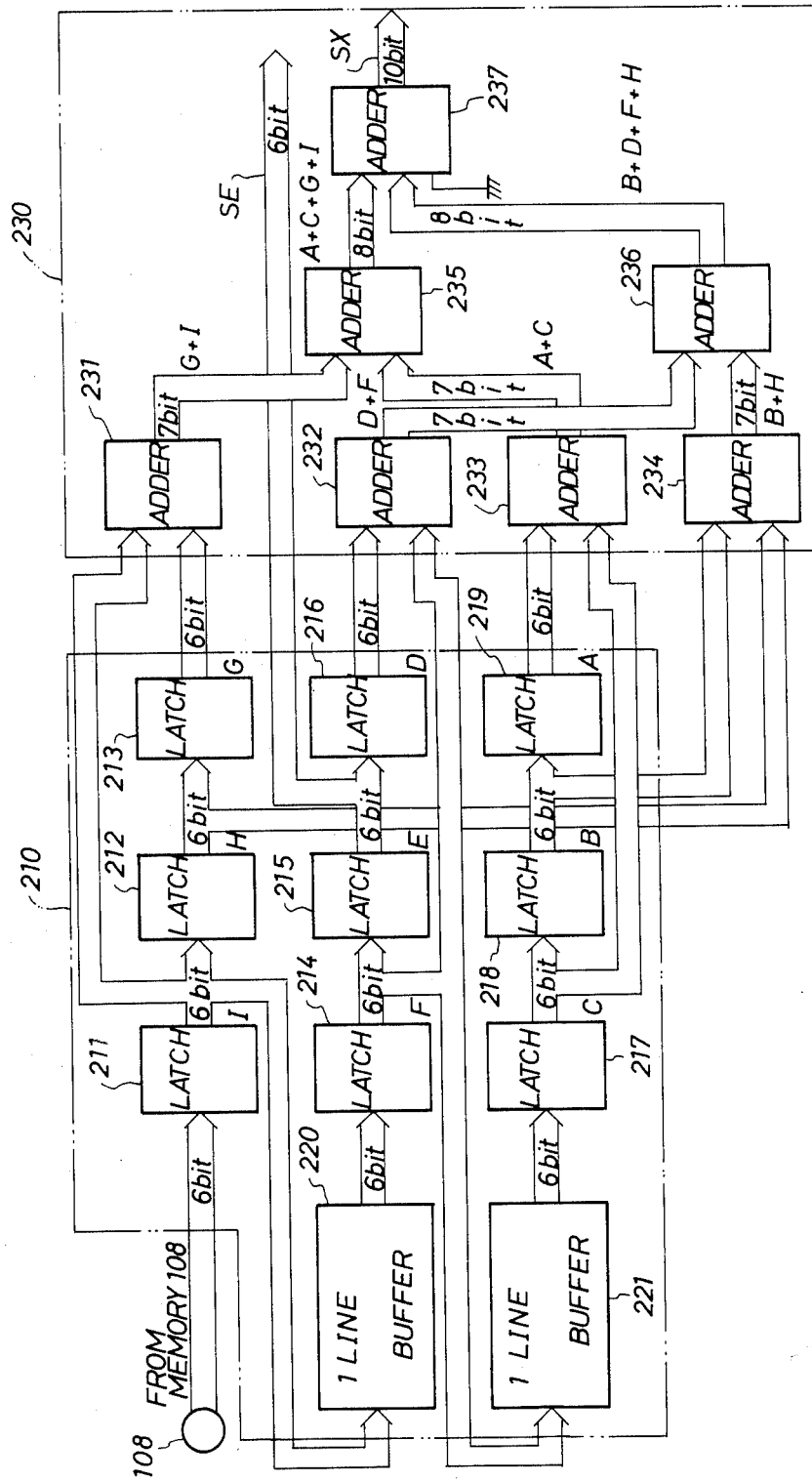

The matrix register U4 and the operation unit U5 are, specifically, constituted as shown in FIG. 8d. The matrix register U4 and the operation unit U5 in FIG. 8a are represented by 210 and 230 respectively in FIG. 8d. Referring to FIG. 8d, the matrix register 210 comprises nine latches 211-219 and two 1-line buffers (memory) 220 and 221.

That is, since each of the latches 211-219 holds the data of 1 picture element respectively and each of the 1-line buffers 220 and 221 stores the data for 1-line to the inside thereof, when the picture element data at the $n_{th}$ line of the $m_{th}$ row (hereinafter referred to as (n, m)) is held to the latch 215 at the central position, for example, picture element data: (n+1, m+1), (n+1, m), (n+1, m−1), (n, m+1), (n, m−1), (n−1, m+1), (n−1, m) and (n−1, m−1) appear at the output of each of the latches 211, 212, 213, 214, 216, 217, 218 and 219 respectively.

That is, the data of each of the picture elements A, B, C, D, E, F, G, H and I constituting the 3×3 matrix shown in FIG. 12 appear at an identical timing at the output terminals for the latches 219, 218, 217, 216, 215, 214, 213, 212 and 211 respectively.

An operation unit 230 is connected to the output of the matrix register 210. The operation unit 230 is composed of seven adders 231, 232, 233, 234, 235, 236 and 237. The output from the latch 211 and the output from the latch 213 are connected to the two input terminals of the adder 231, the output from the latch 214 and the output from the latch 216 are connected to the two input terminals of the adder 232, the output from the latch 217 and the output from the latch 219 are connected to two input terminals of the adder 233 and the output from the latch 212 and the output from the latch 218 are connected to the two input terminals of the adder 234.

Accordingly, the adders 231, 232, 233 and 234 outputs the values: G+I, D+F, A+C and B+H respectively. Since the adder 235 performs the addition of the output data from the adder 231 and the output data from the adder 233, it outputs the value: A+C+G+I. Further, since the adder 236 performs the addition of the output data from the adder 232 and the output data from the adder 234, it outputs the value: B+D+F+H. The outputs from the adders 235 and 236 are connected to the two input terminals of the adder 237. However, the output from the adder 236 is connected to the adder 237 after shifted by one bit to the upper digit. Accordingly, the value: 2.(B+D+F+H)+A+C+G+I appears at the output terminal of the adder 237.

Signal line SE of 6 bits connected to the output of the latch 215 and signal line SX of 10 bits connected to the output of the adder 237 are connected to the input terminals of the operation unit U6. The constitution of the operation unit U6 is shown in FIG. 8e.

Figure 8E:
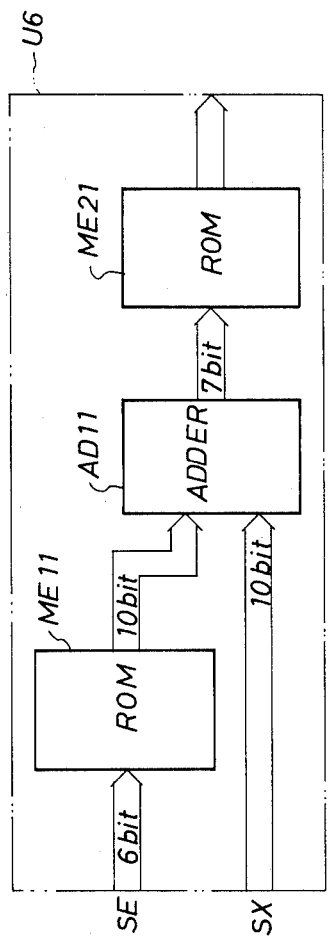

Referring to FIG. 8e, the operation unit U6 comprises read only memories (ROM) ME 11 and ME 21 and adder AD 11. In each of the memory addresses of the memory ME 11, a value of 13 times as large as the address value is previously stored. Accordingly, when the data of the picture element E is inputted to the address terminal of the memory ME 11, a value of 13.E is outputted as the 10 bits data at the output terminal thereof. Since the data is applied to one of the input terminals of the adder AD 11 while the data X is inputted to the other input terminal of the AD 11, the result of the operation: 13.E+X, that is, the result of the edge emphasis processing appears at the output terminal of the adder AD 11. While the adder AD 11 outputs 11 bits data, only the upper 7 bits of them are utilized. Since the 7 bits data may some time deviate from the 0-63 range required as the gradation data, the read only memory ME 21 is provided for confining them within the range 0-63. In each of the addresses of the memory ME 21, a value which is equal to the address value when the address value is of 0-63, a value of 0 when the address value is negative and a value of 63 when the address value is 64 or greater are previously stored respectively. Accordingly, values within the range: 0-63 are outputted as 6 bits data at the output terminal of the memory ME 21.

In this embodiment, the edge extraction circuit 152B shown in FIG. 8a provides both functions of the edge extraction circuit 152 and the edge judging circuit 154 shown in FIG. 7. Referring to FIG. 8a, the edge extraction circuit 152B comprises matrix register U1, operation unit U2 and operation unit U3. In this embodiment, the matrix register U1 and the operation unit U2 have the same constitutions as the matrix register U4 and the operation unit U5 in the edge emphasis circuit 151 respectively.

Although the edge extraction circuit 152B is the same spatial filter with the edge emphasis circuit 151, the coefficients allocated to each of the picture elements in the filters are different. When the data is passed through the filter, the processing result is substantially 0 at the areas other than the edge of the data, by which only the edge information is extracted.

In this embodiment, a pattern PD shown in FIG. 12 is adopted for the edge extraction circuit 152B. Accordingly, when the data is passed through the filter, the data at the central picture element E is converted into E" represented by the following formula:

$$E'' = 12.E - 2(B+D+F+H) - (A+C+G+I)$$

Since the edge emphasis circuit and the edge extraction circuit are similar regarding the processing, structures therefor are also similar with each other.

The signal lines SE and SX connected to the output terminals of the operation unit U2 are connected to the input terminals of the operation unit U3. The constitution of the operation unit U3 is similar to that of the operation unit U6. That is, in view of the circuit diagram, the operation unit U3 is identical with the operation unit U6 excepting that the signal lines led out from the output of the memory ME 21 in FIG. 8e are changed into one line.

Then, the operation unit U3 is explained by replacing the operation unit U6 with the operation unit U3 referring to FIG. 8e. In each of the memory addresses of the memory ME 11, a value of 12 times as great as the value of the address is previously stored. Accordingly, when the data of the picture element E is inputted to the address terminal of the memory ME 11, the value of 12.E is outputted as 10 bits data at the output terminal thereof. Since the data is applied to one of the input terminals of the adder AD 11, and the data of X is inputted to the other input terminals of the AD 11, the result of the calculation: 12.E+X, that is, the result of the edge extraction processing appears at the output terminal of the adder AD 11. The memory ME 21 is a read only memory, and the result of the comparison between the calculation result of 12.E+X and the fixed threshold value of 32, that is, a binary data, is previously stored in the memory address corresponding to the input data.

Accordingly, a binary signal according to the existence of the edge information appears at the output terminal of the edge extraction circuit 152B with every 2×2 pixture element data.

Again referring to FIG. 8a, the sub-matrix processing circuit 153 has one read only memory (ROM) 361. The memory 361 previously stores the result of the comparison between the value of the threshold value matrix table described later and the inputted density data, that is, binary data of "1" and "0" according to the magnitude therebetween. The density data, the main scanning address signal and the sub-scanning address signal are applied to the address terminals of the memory 361.

The threshold value matrix table in this embodiment has an 8×8 2-dimensional matrix structure corresponding to the 8×8 picture element region as the unit for the gradation processing and predetermined values within a range 1-63 are allocated as shown in FIG. 10e to every picture element constituting the matrix. In this embodiment, the threshold values are arranged in the pattern arrangement of a dot concentrated type pattern of vortex form.

The main scanning address signal and the sub-scanning address signal designates the picture element positions in the vertical direction and the lateral direction of the threshold value matrix respectively. Then, the result of the comparison between the threshold value designated and the density data inputted to other address terminals forms output data. Accordingly, if the data, for example, shown in FIG. 10b are inputted successively, the data shown in FIG. 10f are outputted at the timing of each of the picture elements.

In this embodiment, since the memory 361 outputs the data of the two picture elements in adjacent with each other in the main scanning direction simultaneously as 2 bits parallel data, they are converted into 1 bit serial data with every picture element by the shift register 362 connected to the output terminal of the memory 361.

The data outputted from the edge emphasis circuit 151 is applied to the input terminal of dither processing circuit 156.

The dither processing circuit 156 comprises read only memory (ROM) U7 and digital comparator U8. The read only memory U7 previously stores each of the data of a predetermined threshold value matrix table. Specifically, as shown in FIG. 10c, 64 types of threshold value data within the range; 0–63 are arranged at each of the positions of 8×8 matrix in the pattern arrangement of a dot dispersed type pattern of Bayer form. The position in the 8×8 matrix is designated by the main scanning address signal and the sub-scanning address signal. Then, the threshold value data of thus designated position is applied as 6 bits signal with every picture element timing to one of the input terminals of the digital comparator U8.

The digital comparator U8 compares the magnitude of the 6 bits data outputted from the edge emphasis circuit 151 with the 6 bits threshold value data outputted from the memory U7 and outputs binary signal "1" or "0" according to the magnitude in the comparison.

A circuit comprising four logic gates 157, 158, 159 and 160 outputs either the processing result by the sub-matrix processing circuit 153 or the processing result by the dither processing circuit 156 according to the output signal from the edge extraction circuit 152B, that is, according to the existence of the edge information in the inputted image data. That is, the result of the sub-matrix processing excellent in the gradation is utilized if no edge information is contained in the input data, whereas the result of the edge emphasis processing and that of the dither processing excellent in the resolution are utilized if the edge information is contained.

Since the edge extraction circuit 152B judges the existence of the edge from the output data of the 2×2 averaging circuit, the signal outputted from the edge extraction circuit 152B varies at the timing of every 2×2 picture element region. Accordingly, the switching for the gradation processing systems is performed using the 2×2 picture elements, that is, each of the sub-matrix regions in the sub-matrix processing as the minimum unit. That is, since the processing systems are not switched in the course of the processing in each of the sub-matrixes, even if the processing systems are switched frequently, there are no disturbances due to the interference between a plurality of processings, in the result of the processing.

A read/write memory (RAM) 348 interposed between the output from the 2×2 averaging circuit 149 and the input for the sub-matrix processing circuit 153, as well as a read/write memory 374 interposed between the output from the edge extraction circuit 152B and the input for the logic gate 158 are buffer memories for one line of the main scanning. That is, the output data from the 2×2 averaging circuit 149 is updated once for 2-lines in the main scanning and no required data are outputted in the not-updated line. Then, in the data updating line, data of one line are stored in each of the memories and the data are read out for utilization in the next line.

2-line buffer 350 interposed between the output from the dither processing circuit 156 and the input for the logic gate 159 is a read/write memory with the capacity corresponding to the 2-line of the main scanning. That is, since the output data from the sub-matrix processing and the switching signal for processing systems are outputted delayed by 2-line of the main scanning behind the data inputted to the 2×2 averaging circuit 149 due to the presence of the 2×2 averaging circuit 149, the output data from the dither processing circuit 156 is delayed by 2-lines by using the 2-line buffer 350.

The input terminal for the edge extraction circuit 152B is connected to the output terminal of the 2×2 averaging circuit 149 for preventing the frequent occurrence of the switching operation of the gradation processing systems, as well as for another object of preventing erroneous judgement for the edge detection relative to the mesh-point image.

In the ordinary printed matters subjected to mesh point processing, the mesh-point pitch is about from 100 to 175 lines/inch, while the sampling pitch of the image reading scanner used for the image processing unit is about from 300 to 400 dpi (dot/inch). Accordingly, the positional relationship between the mesh points and each of the picture element data to be sampled is, for example, as shown in FIG. 15a (no edge information is contained). In FIG. 15a, PS1 represents the sampling pitch and Pd represents the mesh-point pitch. When the data obtained from FIG. 15a are passed through a 3×3 filter for edge extraction, the density of the noted central picture element is approximately at the highest density, while the density of other peripheral picture elements is less than one-half of the highest density, for example, in the 9 picture elements within the region AR1 in FIG. 15a. Accordingly, edge information is extracted although the original image contains no such edge information.

If the erroneous judgement of such kind is resulted, edge emphasis is performed also to the image which does not contain edge information, and the noise components at higher spatial frequency are emphasized and appear all over the outputted image, to reduce the image quality. The erroneous judgement as described above is resulted due to the relationship between the size of the edge extraction filter and the sampling pitch of the image data and it may be possible to eliminate such an error by increasing the number of the elements for the edge extraction filter and properly selecting the parameter. However, the filter of increased number of elements is extremely complicated in the structure and expensive as well.

In this embodiment, since the input of the edge extraction circuit 152 is connected to the output of the 2×2 averaging circuit 149, no erroneous judging as described above is resulted. Specifically in FIG. 15b, the data in FIG. 15a are shown by dividing them with every four picture element (block) in adjacent with each other in the main scanning direction and the subscanning direction, which are equivalent to the output from the 2×2 averaging circuit 149. Accordingly, the pitch PS2 of the picture element blocks is twice as large as PS1. When each of the picture element blocks is corresponded to each of the elements of the edge extraction filter, the nine picture element blocks noted by the filter are in a region, for example, shown by AR2. In this case, since many mesh points are allocated substantially equally to each of the elements of the filter, no edge information is extracted and, accordingly, no erroneous judgement is resulted.

Binary data of every colors (Y, M, C, BK) formed by the gradation processing circuit 109 as has been described above are applied to the laser drivers 43y, 43m, 43c and 43bk for each of the colors.

In FIG. 2, the synchronization control circuit 114 determines the actuation timing of each of the elements as described above and matches the timing between each of the elements. A microprocessor system 200 controls the entire elements showh in FIG. 2 as has been described above, that is, performs the control as the copying machine. The processor system 200 performs the control for reproduction for each of the modes set by the console and performs those sequences for photosensitive body power system, exposure system, charger system, developing system, fixing system and the like as well as the image reading-recording system illustrated in FIG. 2.

FIG. 13 shows the interface between the polygonal mirror driving motor, etc and the microprocessor system (200 shown in FIG. 2). Input/output port 207 shown in FIG. 13 is connected to the bus 206 of the system 200.

In FIG. 13, 45 represents a motor for rotating the photosensitive drums 18bk, 18y, 18m and 18c and it is actuated from motor driver 46.

In addition, processing circuits connected to drivers for actuating respective elements or sensors are provided in the copying machine, and they are connected to the system 200 by way of the input/output port 207 or other input/output ports, although not illustrated in the drawings.

Explanation will then be made to the operation timing of each of the sections based on the control operations of the microprocessor system 200 and the synchronization control circuit 114.

At first, when the power switch (not illustrated) is turned ON, the device starts the warming-up operation to conduct the operations such as:
raising temperature for the fixing unit 36;
setting the polygonal mirror to the constant speed of rotation;
home positioning for the carriage 8;
generation of line synchronizing clock pulses (1.26 KHz);
generation of video synchronizing clock pulses (8.42 KHz); initialization for the each of the counters, etc.

The line synchronizing clock pulses are supplied to the motor driver for polygonal mirror and the CCD driver. The clock pulses for the former are used as the reference signal for the phase locked loop (PLL) servo, by which the beam detection signals from the beam sensors 44bk, 44y, 44m and 44c which are the feedback signals are aligned to have the identical frequency of line synchronizing clocks and a predetermined phase relationship therewith. The latter clock pulses are utilized as the starting signal for the main scanning for CCD reading. Since the detection signals (pulses) from the beam sensors 44bk, 44y, 44m and 44c are outputted on each color (by each sensor), they are utilized as the signal for synchronizing the start of the laser beam main scanning. The frequency of the line synchronizing signal and that of the detection signal for each of the beam sensors are locked by PLL and identical with each other but some phase difference may be resulted therebetween. Accordingly, not the line synchronizing signal but the detection signal from each of the beam sensors is used as the reference for the scanning.

The video synchronizing clock has a frequency corresponding to 1 dot (1 picture element) unit, which is supplied to the CCD driver and the laser driver.

There are various counters, i.e.,
(1) line counter for reading,
(2) line counter for writing for each of BK, Y, M and C,
(3) dot reading counter,
(4) dot writing counter for each of BK, Y, M and C.

(1) and (2) described above are program counters substituted by the operation of CPU 202 in the microprocessor system, while (3) and (4) are additionally disposed hardwares although not illustrated.

Then, the timing for the print cycle is shown and described referring to FIG. 14. When the warming-up operation has been completed, the print enable state is attained. Then, when the copy start switch 301 is turned ON, the motor for driving the first carriage 8 (FIG. 13) starts to rotate by the operation of the CPU 202 in the system 200, and the carriages 8 and 9 (at one-half speed of carriage 8) start the scanning (exposure scanning) toward the left. If the carriage 8 is at the home position, the output of the home position sensor 39 is at "H", which turns to "L" soon after the starting of the exposure scanning (sub-scanning). The line counter for reading is cleared and, at the same time, the count enable state is set at the instance of turning from "H" to "L". The turning point from "H" to "L" occurs at a position of exposing the end of the original document.

The line counter for writing is counted up on every one pulse of line synchronizing clock entering after the sensor 39 has been turned to "L". Further, upon entering of the line synchronizing clock, the dot counter for reading is cleared at the rise of the clock pulse to attain the count enable state.

Accordingly, reading for the first line is conducted after the home position sensor 39 has been turned to "L" and in synchronization with the video synchronizing clock pulse just after the arrival of the first line synchronizing clock pulse, and picture element 1, picture element 2, — picture element 4667 are read in successively. The picture elements are counted by the dot counter for reading. The content of the line counter for reading in this instance is 1. Reading after the second line is conducted in the same manner. That is, the line counter for reading is incremented and the dot counter for reading is cleared by the next line synchronizing clock pulse, and the dot counter for reading is incremented and the picture elements are read in synchronization with the video synchronizing clocks entering subsequently.

In this way, the lines are read successively and, when the line counter for reading counts up to the 6615 line, the last reading is carried out on the line, and then the carriage drive motor is actuated backwardly to return the carriages 8 and 9 to the home position.

The picture element data thus read in are successively sent to the image processing unit 100 and applied with various kinds of image processings. The time required for the image processings are at least for two clock pulse of the line synchronizing clock signal.

Referring then to the writing, the line counter for writing is cleared and count enabled. Specifically, clearing and count enabling are carried out for the BK line counter for writing if the line counter for reading is at 2; for Y line counter for writing if the line counter for reading is at 1577; for M line counter for writing if the line counter for reading is at 3152; and C line counter for writing if the line counter for reading is at 4727 respectively.

These counting up operations are conducted at the rising of the detection signals of the respective beam sensors 44bk, 44y, 44m and 44c. Further, the dot counters for writing (BK, Y, M, C) are cleared upon rising of the detection signals of the respective beam sensors and counted up by the video synchronizing signals.

Writing for each of the colors is conducted when the content of the line counter for reading reaches a predetermined value, the counter for writing for each of the colors attains the count enable state and when the content of the dot counter for writing is at a predetermined value corresponding to the initial beam sensor detection signal (content 1), by driving the laser driver. When the dot counter is at 1 - 401, dummy data is outputted. When the dot counter is at 401 - 5077 (4677 pieces) writing is possible. The dummy data are used for adjusting the physical distance between the beam sensors 44bk, 44y, 44m and 44c and the photosensitive drums 18bk, 18y, 18m and 18c. Further, the writing data (1 or 0) are caught by the fall of the video synchronizing signals. The writing in the line direction is possible when each of the line counter for writing is at 1 - 6615.

Now as shown in FIG. 14, since BK recording data is obtained at the scanning of third line by CCD after the start of the exposure scanning, recording actuation for the BK recording device is started in synchronization with the obtainment of the BK data. Accordingly, the frame buffer memory is saved in the BK signal processing line. While on the other hand, since the Y, M and C recording devices are deviated in the paper feeding direction, it is necessary to store the recording signals during delay times Ty, Tm and Tc corresponding to the displacement from the BK recording device (FIG. 6). As has been described above, the frame memory 108y of 87K bytes, the flame memory 108m of 174K bytes and the frame memory 108c of 261K bytes are disposed for this purpose and the memory data are stored in the form of the gradation data before conversion to the density data for reducing the memory capacity in these memories. Accordingly, the memory capacity can be saved, as the BK frame memory is not required and, further, the capacity for each of the frame memories is reduced since the data are stored in the form of the gradation data. The photosensitive drum has a circumferential length (2 $\pi$r) remarkably shorter than the length of the longitudinal side of A3 set as maximum size in the copying machine and, accordingly, the pitch for arranging the photosensitive drums is extremely short.

Although the spatial filter of 3×3 element structure is used for extracting the edge information, and the averaging circuit for averaging the data of 2×2 picture element is connected to the input of the filter in the above-mentioned embodiment, the number of the elements of the filter and the number of picture elements in the averaging circuit may optionally be varied according to the changes in the mesh-point pitch of the original image or the sampling pitch of the image reading scanner.

Although the sub-matrix method is used in the gradation processing circuit 109 to binarize the input data in the above-mentioned embodiment, the gradation processing circuit 109 may also be constituted as shown in FIG. 16 by using the density pattern processing method to binarize the input data. That is, as can be seen from FIGS. 16 and 17a, the gradation processing circuit 109 using the density pattern processing method has the same constitution with FIG. 7 excepting comprising 4×4 averaging circuit 150 and density pattern processing circuit 153a instead of the sub-matrix processing circuit 153 and comprising edge judging circuit 154a different from the edge judging circuit 154 shown in FIG. 7.

In the density pattern processing in this embodiment, average density is determined with every 8×8 picture element regions disposed continuously in the main scanning direction and the sub-scanning direction for image reading, thus determined average density and the threshold value in the predetermined threshold value matrix table (8×8) at the position corresponding to the picture element are compared with each other in the magnitude and binary data of "1" or "0" are generated with every picture element according to the result. It is required to determine the average density data of 8×8 picture elements for the density pattern processing. Since the 2×2 averaging circuit 149 outputs the average density data with every 2×2 picture elements, input terminal of the 4×4 averaging circuit 150 is connected to the output terminal of the 2×2 averaging circuit to obtain the average density of the 8×8 picture element region. The structure of the 4×4 averaging circuit is simpler than the circuit for determining the average value of 8×8 regions.

Then, referring to FIG. 17a, the output data from the 2×2 averaging circuit 149 is applied by way of the 4×4 averaging circuit 150 to the density pattern processing circuit 153a. While only the upper 6 bits from the 2×2 averaging circuit 149 are applied to the edge extraction circuit 152, the upper 7 bits of the output data from the 2×2 averaging circuit 149 are applied to the 4×4 averaging circuit 150 in order to reduce the error.

What are averaged by the 4×4 averaging circuit 150 are the data group of the 4×4 block regions present at the continuous four positions in the main scanning direction and the sub-scanning direction respectively outputted from the 2×2 averaging circuit 149 with every blocks (each comprising 2×2 picture elements). Referring to FIG. 17f, the 4×4 averaging circuit 150 comprises latches LA 111 and LA 211, adders AD 111, AD 211 and AD 311, bus drivers BD 111, BD 211 and BD 311 and read/write memories (RAM) ME 111 and ME 211.

Operation of the 4×4 averaging circuit 150 is described referring to FIG. 17g. The data of the blocks in adjacent with each other in the main scanning direction appear successively as serial signals at the input of the circuit. The contents of the data are updated with every 2 picture elements. Considering at first the main scanning direction, the odd number data (1, 3, 5, ---) is held in the latch LA 111 for a period of time for about 2-blocks (4 picture elements). Accordingly, the odd number data is applied to bits 0-6 at one input terminal A of the adder AD 111, while the even number data (2, 4, 6, ---) succeeding the above-mentioned data is applied to bits 0-6 at the other input terminal B of the adder AD 111. Accordingly, the sum of the even number and odd number data (1+2, 3+4, 5+6, ---) appears at the output of the adder AD 111 just after the input of the even number data. Among the data, the odd number data (1+2, 5+6, 9+10, ---) are held in the latch LA 211 at a predetermined timing and applied to bits 0-7 at one input terminal A of the adder AD 211. On the other hand, the even number data (3+4, 7+8, 11+12, ---) among the data is applied to bits 0-7 at the other input terminal B of the adder AD 211. Accordingly, just after the appearing of the even number data, the sum of the odd number and the even number data (1+2+3+4, 5+6+7+8, ---) appears at the output terminal of the adder AD 211.

Then, explanation of the sub-scanning direction is made. Among the output data from the adder AD 211, each of the first data of the 4 blocks continuous in the subscanning direction in the 2×2 blocks (1, 5, 8, ---) is stored by way of the bus driver BD 111 into the memory ME 111. When the second data appears, the data is applied to the input terminal A of the adder AD 311, while the first data stored in the memory ME 111 is read out and applied to the input terminal B of the adder AD 311. In this instance, the data appearing at the output of the adder AD 311 (1+2, 5+6, ---) is stored by way of the bus driver BD 311 into the memory ME 211. Then, when the third data (3, 7, 11, ---) appears, the data is applied to the input terminal A of the adder AD 311, while the data stored in the memory ME 211 (1+2, 5+6, 9+10, ---) is read out and applied by way of the bus driver BD 311 to the input terminal B of the adder AD 311. The data appearing at the output of the adder AD 311 (1+2+3, 5+6+7, ---) is stored by way of the bus driver BD 311 into the memory ME 111. Then, when the fourth data (4, 8, 12, ---) appears, the data is applied to the input terminal A of the adder AD 311, while the data stored at the preceding time into the memory ME 111 (1+2+3, 5+6+7, ---) is read out and applied by way of the bus driver BD 211 to the input terminal B of the adder AD 311. In this case, the data appearing at the output terminal of the adder AD 311 is the sum of 4 blocks continuous in the sub-scanning direction, that is, the sum of the data of 8 picture elements. In this case, the data outputted from the adder AD 211, is the sum of the 4 blocks continuous in the main scanning direction, that is, the sum of the data of the 8 picture elements. Accordingly, the data outputted from the adder AD 311 at the timing just after the appearing of the data of the fourth block in the sub-scanning direction, is the total sum of 4×4 blocks, that is, the data of 8×8 picture elements.

However, since in the 9 bits data outputted from the adder AD 211, the lower 3 bits are neglected and only the upper 6 bits are actually applied to the adder AD 311, and in the 7 bits data outputted from the adder AD 311, the lowest bit is neglected and only the upper 6 bits are taken out at the output terminal of the 4×4 averaging circuit 150, a value of 1/16 of the total sum of the data of the 4×4 block region, that is, the value of the averaged density data of the 4×4 blocks (8×8 picture elements) can thus be obtained.

The density pattern processing circuit 153a comprises one read only memory (ROM) 361a. The memory 361a previously stores the result of comparison between the threshold value matrix table described later and the inputted density data, that is, the binary data of "1" or "0" according to the magnitude therebetween. The density data and the sub-scanning address signal are applied to the address terminals of the memory 361a.

The matrix table of threshold value in this embodiment has 8×8 2-dimensional matrix structure corresponding to 8×8 matrix element as the gradation processing unit, in which predetermined values within the range: 1-63 are allocated as shown in FIG. 10e to each of the picture elements constituting the matrix. In this embodiment, the threshold values are arranged in an arrangement of dot concentrated type pattern of vortex form.

3-bit sub-scanning address signal designates the vertical position of picture element in the threshold value matrix. The result of the comparison between thus designated 8 threshold values and the density data inputted to other address terminal, forms output data (8 bits). Each of the bits of the data is the binary data for each of the picture elements in the main scanning direction in the 8×8 matrix region. Accordingly, when the data shown in FIG. 10b are inputted successibely, the data shown in FIG. 10f are outputted at a predetermined timing with every 8 picture elements.

The 8 bits data, that is, 8 picture element data outputted from the density pattern processing circuit 153a are converted into 1-bit serial data with every picture elements by the 8 bits shift register 362a connected to the output of the circuit 153a and applied to the logic gate 157 at the timing of each of the picture elements.

Accordingly, the result of the density pattern processing excellent in the gradation is utilized if the input data contain no edge information, whereas the result of the edge emphasis processing and that of the dither processing excellent in the resolution is utilized if the edging formation is contained in this embodiment.

The edge extraction circuit 152 constituted in the same manner with the circuit 152B in FIG. 8a judges the existence of the edge based on the output data from the 2×2 averaging circuit as described above and outputs a signal varying at the timing of every 2×2 picture elements regions.

However, since the density pattern processing circuit 153a and the dither processing circuit 156 perform the gradation processing with every 8×8 picture elements in this embodiment the switching for the gradation processing systems is also conducted with every minimum unit of 8×8 picture element region. Therefore, the edge judging circuit 154a is connected to the output of the edge extraction circuit 152.

In the following explanation, the 2×2 picture element region averaged in the 2×2 averaging circuit 149 is described as "block", while the position of each of the picture elements in the sub-scanning direction is described as "line".

The edge judging circuit 154a outputs the binary data indicating the existence of at least one block which contains edge in the 4×4 block region. Referring to FIG. 17a, the edge judging circuit 154a comprises latch 342, random access memories 345, 346 and 347 and bus driver 344, etc. The schematic operation of the edge judging circuit 154a in FIG. 17a is shown in FIG. 17h. The operation of the edge judging circuit 154a will be explained referring to FIG. 17h. The latch 342 latches the input signal with every occurrence of the input signal of each of the blocks in synchronization with the generation timing thereof. Further, the latch 342 resets the data latched at the timing with every 4 blocks. The edge judging circuit 154a repeats the same operation with every 4 blocks, that is, with every 8 lines of the sub-scanning.

At first, description will be made from the state where the reset of the latch 342 has been completed in the first line ($n_{th}$ line in FIG. 17h). The edge data corresponding to the first block is applied by way of the OR gate 341 to the latch 342 and then held in the latch 342 at the first latch timing. In the same manner, the latch 342 holds the input data of the second block (n+2th line), third block (n+4th line) and fourth block (n+6th line) at the timing of each of the data. The data held in the latch 342 is applied to one of the input terminals of the OR gate 341. Accordingly, once the data "1" has been inputted to the latch 342 after the completion of reset, the input data to the latch 342 thereafter is always "1". When latching the data of 4 blocks has been completed after the resetting, the output data from the latch 342 is applied by way of the bus driver 344 and stored in the memory 345.

The latch 342 is reset soon after, and subsequently performs the data processing for 4 blocks in the same manner as described above. However, the address of the memory 345 for storing the data of the latch 342 is updated with every memorizing. That is, edge information of the first block in the sub-scanning direction in the matrix comprising 4×4 blocks (whether "1" is present in the 4 blocks or not) is stored in the memory 345.

Also in the third line (the second block in the sub-scanning direction), the existence of "1" in the 4 blocks is examined with every resetting of the latch 342. However, when the result for the 4 blocks is obtained, the data from the memory 345 storing the data of the first block in the sub-scanning direction is read out and the logic sum of the data and the result of the second block (output from the OR gate 343) is stored by way of the bus driver 344 in the memory 346.

In the fifth line (third block in the sub-scanning direction), when the data of 4 blocks in the main-scanning direction are obtained, the data from the memory 346 storing the data for the first block and the second block in the sub-scanning direction is read out and the logic sum of thus read out data and the result of the fifth line (output from the OR gate 343) is stored by way of the bus driver 344 into the memory 345.

In the sixth line (4th block in the sub-scanning direction), when the data of 4 blocks in the main-scanning direction are obtained, the data from the memory 345 storing the data for first to third blocks in the main scanning direction is read out and the logical sum of the thus read out data and the result from the fourth block (output from the OR gate 343) is stored in the memory 347. That is, the memory 347 stores at its corresponding address, "1" if there is one or more edge data "1" in the unit processing region (8×8 picture element matrix) or "0" if there is no such edge data.

Final information stored in the memory 347 is read out at a predetermined timing and applied to inverter 158 and AND gate 159.

8-line buffer 350 interposed between the output of the dither processing circuit 156 and the logic gate 159 is a read/write memory having the capacity of the main scanning for 8 lines. That is, since the output data from the density pattern processing and the switching signal for the processing systems are outputted behind the data inputted to the 2×2 averaging circuit 149 by 8 line of main scanning due to the 2×2 averaging circuit 149 and the 4×4 averaging circuit 150, the output from the dither processing circuit 156 is delayed by 8 lines by the 8-line buffer 350 in order to much the timing with the delay.

Although one of the gradation processing systems is composed of the edge emphasis processing circuit 151 and the dither processing circuit 156 in the embodiment shown in FIG. 7 and in the embodiment shown in FIG. 16, it may be composed of the edge extraction circuit 151, binarization circuit 164, dither processing circuit 156 and OR gate 165 as shown in FIGS. 18 or 20.

That is, in the second gradation processing system of the other embodiment shown in FIGS. 18 or 20, edge information is extracted from the data inputted as multi-value data, and the result of synthesizing the data obtained by binarizing this extracted information and the binary data obtained by the dither processing (specifically, logical sum) is outputted.

Details for the second gradation processing system shown in FIGS. 18 and 20 are illustrated in FIG. 19 by being applied to the embodiment shown in FIG. 7. As apparent from FIG. 19, edge extraction circuit 151B is composed of matrix register U4, operation units U5 and U6, and has the same constitution with the edge extraction circuit 152B. Accordingly, the constitutions are identical between the matrix registers U1 and U4, between the operation units U2 and U5 and between the operation units U3 and U6 respectively. The edge extraction circuit 151B shown in FIG. 19 provided both of the functions of the edge extraction circuit 151 and the binarization circuit 164 in FIG. 18. The edge extraction circuit 151 is a 2-dimensional spatial filter. When the density data is passed through the filter, the processed result in the portion other than the edge portion of the data is substantially 0, by which only the edge information is extracted. The edge extraction circuit 151 utilizes the pattern PD shown in FIG. 12 in the same manner with the edge extraction circuit 152.

Accordingly, binary signals according to the existence of the edge information is outputted at the output terminal of the edge extraction circuit 151B. The state at the output terminal of the edge extraction circuit 151B varies with every picture element unit, which is different from the state at the output terminal of the edge extraction circuit 152B that varies with every 2×2 picture element data.

The data of every picture element unit applied to the gradation processing circuit 109 is applied by way of the edge extraction circuit 151B to the comparator U8 of the dither processing circuit 156. However, the circuit 151B is utilized for matching the timing and causes no variation in the data passed therethrough. The digital comparator U8 compares the magnitude of the inputted picture element data, that is, the density level, with the 6 bits threshold value data outputted from the memory U7 with every picture element unit and outputs binary signals of "1" or "0" according to the result of the comparison.

A circuit composed of four logic gates 157, 158, 159 and 160 outputs either the processed result from the sub-matrix processing circuit 153 or the output signal from the OR gate 165, according to the result of the judgement of the edge judging circuit 154 in accordance with the output from the edge extraction circuit 152, that is, according to the existence of the edge information in the inputted image data. That is, the result of the sub-matrix processing excellent in the gradation is utilized if no edge information is contained in the inputted data, whereas the logical sum for the result of the dither processing and the edge data is utilized if the edge information is contained. The latter is excellent in the resolution.

The embodiment shown in FIG. 20 is a gradation processing circuit 109 applied with the density pattern processing which has been explained referring to FIG. 16 in the embodiment shown in FIG. 18. Accordingly, the edge judging circuit 154a shown in FIGS. 16 and 17a is used as the edge judging circuit in this embodiment and the details therefor are shown in FIG. 21. Also this embodiment shown in FIG. 20 operates in the same manner as described above.

What is claimed is:

1. A digital image processing device for intermediate tone having threshold value tables provided with threshold values different from each other set for each of picture elements in a unit region containing a plurality of picture elements for gradation processing, in which inputted multi-value data are converted into binary data referring to said table and intermediate tone is expressed by adjusting the number of picture elements to be dotted and picture elements not to be dotted within the unit region of the gradation processing, wherein said device comprises;

averaging means for averaging data of a plurality of picture element contained in every first region smaller than said unit region for the gradation processing;

first gradation processing means including edge emphasis processing means for applying edge emphasis processing to data of every picture element and binarizing data outputted from said emphasis processing means with the values of a predetermined threshold value table;

second gradation processing means for conducting processing different from that of said first gradation processing means;

edge judging means by monitoring output data from said averaging means and judging an existence of edge information with every said first region; and control means for selecting either said first gradation processing means or second gradation processing means according to a result of the judgement of said edge judging means.

2. A digital image processing device for intermediate tone as defined in claim 1, wherein the second processing means binarizes data outputted from the averaging means with data of the threshold value table in which threshold values are set with every picture element unit respectively.

3. A digital image processing device for intermediate tone as defined in claim 1, wherein the averaging means is of averaging multi-value data of a plurality of picture elements in adjacent with each other in both of a main scanning direction and a sub-scanning direction which are outputted successively from an image reading device that reads 2-dimensional image by conducting main scanning and sub-scanning.

4. A digital image processing device for intermediate tone as defined in claims 3, wherein the second processing means binarizes data outputted from the averaging means with data of the threshold value table in which threshold values are set with every picture element unit respectively.

5. A digital image processing device for intermediate tone as defined in claim 1, wherein the first gradation processing means applies a dither processing to data after subjected to the edge emphasis processing.

6. A digital image processing device for intermediate tone as defined in claim 5, wherein the second processing means binarizes data outputted from the averaging means with data of the threshold value table in which threshold values are set with every picture element unit respectively.

7. A digital image processing device for intermediate tone having threshold value tables provided with threshold values different from each other set for each of picture elements in a unit region containing a plurality of picture elements for gradation processing, in which inputted multi-value data are converted into binary data referring to said table and intermediate tone is expressed by adjusting the number of picture elements to be dotted and picture elements not to be dotted within the unit region of the gradation processing, wherein said device comprises;

averaging means for averaging data of a plurality of picture element contained in every first region smaller than said unit region for the gradation processing;

first gradation processing means including edge emphasis processing means for applying edge emphasis processing to data of every picture element and binarizing data outputted from said emphasis processing means with the values of a predetermined threshold value table;

second gradation processing means for conducting processing different from that of said first gradation processing means;

edge judging means by monitoring output data from said averaging means and judging an existence of edge information with every said second region greater than said first region; and control means for selecting either said first gradation processing means or second gradation processing means according to a result of the judgement of said edge judging means.

8. A digital image processing device for intermediate tone as defined in claim 7, wherein the extent of the second region is identical with that of the threshold value table.

9. A digital image processing device for intermediate tone as defined in claim 7, wherein the averaging means is of averaging multi-value data of a plurality of picture element in adjacent with each other in both of a main scanning direction and a sub-scanning direction which are outputted successively from an image reading device that reads 2-dimensional image by conducting main scanning and sub-scanning.

10. A digital image processing device for intermediate tone as defined in claim 9, wherein the extent of the second region is identical with that of the threshold value table.

11. A digital image processing device for intermediate tone as defined in claim 7, wherein the first gradation processing means applies a dither processing to the data after subjected to the edge emphasis processing.

12. A digital image processing device for intermediate tone as defined in claim 11, wherein the extent of the second region is identical with that of the threshold value table.

13. A digital image processing device for intermediate tone as defined in claim 7, wherein the second gradation processing means averages data before the gradation processing, with every said second region, and outputs binary signals according to a result of the comparison between a result of the averaged data and each of data in the threshold value table where threshold values are set with every picture element unit respectively.

14. A digital image processing device for intermediate tone as defined in claim 13, wherein the extent of the second region is identical with that of the threshold value table.

15. A digital image processing device for intermediate tone as defined in claim 13, wherein an input terminal of the second gradation processing means is connected with an output terminal of the averaging means.

16. A digital image processing device for intermediate tone as defined in claim 23 wherein the extent of the second region is identical with that of the threshold value table.

17. A digital image processing device for intermediate tone having threshold value tables provided with threshold values different from each other set for each of picture elements in a unit region containing a plurality of picture elements for gradation processing, in which inputted multi-value data are converted into binary data referring to said table and intermediate tone is expressed by adjusting the number of picture elements to be dotted and picture elements not to be dotted within the unit region of the gradation processing, wherein said device comprises;
  averaging means for averaging data of a plurality of picture element contained in every first region smaller than said unit region for the gradation processing;
  first gradation processing means including binarizing means for binarizing each of input data of every picture element with values in a predetermined threshold value table, edge extracting means for extracting edge information in the input data and data synthesizing means for synthesizing data from data outputted from said binarizing means and data outputted from said extracting means;
  second gradation processing means for conducting processing different from that of said first gradation processing means;
  edge judging means by monitoring output data from said averaging means and judging an existence of edge information with every said first region; and
  control means for selecting either said first gradation processing means or second gradation processing means according to a result of the judgement of said edge judging means.

18. A digital image processing device for intermediate tone as defined in claim 17, wherein the second gradation processing means binarizes data outputted from the averaging means with data in a threshold value table where threshold values are set with every picture element unit respectively.

19. A digital image processing device for intermediate tone as defined in claim 17, wherein the averaging means is of averaging data of a plurality of picture elements in adjacent with each other in both of a main scanning direction and a sub-scanning direction which are outputted successively from an image reading device that reads 2-dimensional image by conducting main scanning and sub-scanning.

20. A digital image processing device for intermediate tone as defined in claim 19, wherein the second gradation processing means binarizes data outputted from the averaging means with data in a threshold value table where threshold values are set with every picture element unit respectively.

21. A digital image processing device for intermediate tone as defined in claim 17, wherein the binarizing means of the first gradation processing means, conducts a dither processing and the data synthesizing means conducts a logical sum of said two input data.

22. A digital image processing device for intermediate tone as defined in claim 21, wherein the second gradation processing means binarizes data outputted from the averaging means with data in a threshold value table where threshold values are set with every picture element unit respectively.

23. A digital image processing device for intermediate tone having threshold value tables provided with threshold values different from each other set for each of picture elements in a unit region containing a plurality of picture element for gradation processing, in which inputted multi-value data are converted into binary data referring to said table and intermediate tone is expressed by adjusting the number of picture elements to be dotted and picture elements not to be dotted within the unit region of the gradation processing, wherein said device comprises;
  averaging means for averaging data of a plurality of picture element contained in every first region smaller than said unit region for the gradation processing;
  first gradation processing comprising binarizing means for binarizing each of input data of every picture element with values in a predetermined threshold value table respectively, edge extracting means for extracting edge information in the input data and data synthesizing means for synthesizing data from data outputted from said binarizing means and data outputted from said edge extracting means;
  second gradation processing means for conducting processing different from that of said first gradation processing means;
  edge judging means by monitoring output data from said averaging means and judging an existence of edge information with every said second region greater than said first region; and
  control means for selecting either said first gradation processing means or second gradation processing means according to a result of the judgement of said edge judging means.

24. A digital image processing device for intermediate tone as defined in claim 23, wherein the extent of the second region is identical with that of the threshold value table.

25. A digital image processing device for intermediate tone as defined in claim 23, wherein the averaging means is of averaging multi-value data of a plurality of picture element in adjacent with each other in both of the main scanning direction and the sub-scanning direction which are outputted successively from an image reading device that reads 2-dimensional image by conducting main scanning and sub-scanning.

26. A digital image processing device for intermediate tone as defined in claim 25, wherein the extent of the second region is identical with that of the threshold value table.

27. A digital image processing device for intermediate tone as defined in claim 23, wherein the binarizing means of the first gradation processing means conducts a dither processing and the data synthesis means outputs a logical sum of said two input data.

28. A digital image processing device for intermediate tone as defined in claim 27, wherein the extent of the second region is identical with that of the threshold value table.

29. A digital image processing device for intermediate tone as defined in claim 23, wherein the second gradation processing means averages data before the gradation processing, with every said second region, and outputs binary signals according to a result of the comparison between a result of the averaged data and each of data in a threshold value table where threshold values are set with every picture element unit respectively.

30. A digital image processing device for intermediate tone as defined in claim 29, wherein the extent of the second region is identical with that of the threshold value table.

31. A digital image processing device for intermediate tone as defined in claim 18, wherein an input terminal of the second gradation processing means is connected with an output terminal of the averaging means.

32. A digital image processing device for intermediate tone as defined in claim 31, wherein the extent of the second region is identical with that of the threshold value table.

* * * * *

UNITED STATES PATENT AND TRADEMARK OFFICE
CERTIFICATE OF CORRECTION

PATENT NO. : 4,742,400

DATED : May 3, 1988

INVENTOR(S) : KATSUHISA TSUJI

It is certified that error appears in the above-identified patent and that said Letters Patent is hereby corrected as shown below:

Title page:

Please change the current name of the Assignee, as it appears on the Letters Patent, from "Ricoh Corporation" to --Ricoh Company, Ltd.--.

Signed and Sealed this

Thirteenth Day of December, 1988

Attest:

DONALD J. QUIGG

*Attesting Officer*    *Commissioner of Patents and Trademarks*